United States Patent
Walker et al.

(10) Patent No.: US 9,943,978 B2
(45) Date of Patent: Apr. 17, 2018

(54) SYSTEM FOR CUTTING SPIRAL SHAPED PIECES

(71) Applicant: J.R. Simplot Company, Boise, ID (US)

(72) Inventors: David Bruce Walker, Meridian, ID (US); Allen J. Neel, Nampa, ID (US); James Englar, Nampa, ID (US); Dessa Bokides, Nampa, ID (US)

(73) Assignee: J.R. Simplot Company, Boise, ID (US)

( * ) Notice: Subject to any disclaimer, the term of this patent is extended or adjusted under 35 U.S.C. 154(b) by 237 days.

(21) Appl. No.: 14/868,987

(22) Filed: Sep. 29, 2015

(65) Prior Publication Data
US 2016/0016326 A1    Jan. 21, 2016

Related U.S. Application Data

(63) Continuation-in-part of application No. 14/712,857, filed on May 14, 2015, which is a continuation of (Continued)

(51) Int. Cl.
*B26D 7/08*    (2006.01)
*B26D 7/06*    (2006.01)
(Continued)

(52) U.S. Cl.
CPC ............ *B26D 7/2628* (2013.01); *A23L 19/12* (2016.08); *A23P 30/10* (2016.08); *B26D 1/28* (2013.01);
(Continued)

(58) Field of Classification Search
CPC .............. B26D 1/28; B26D 2001/0073; B26D 2001/006; B26D 2001/0053; B26D 3/11;
(Continued)

(56) References Cited

U.S. PATENT DOCUMENTS

| 371,579 A | 10/1887 | Harding |
| 978,482 A | * 12/1910 | Petri .................... A21C 11/106 30/302 |

(Continued)

OTHER PUBLICATIONS

US Patent and Trademark Office; Office Action for U.S. Appl. No. 13/647,319 dated Sep. 5, 2014.
(Continued)

*Primary Examiner* — Ghassem Alie
*Assistant Examiner* — Bharat C Patel
(74) *Attorney, Agent, or Firm* — Parsons Behle & Latimer

(57) ABSTRACT

A rotary knife fixture configured for use in a water knife cutting system includes a ring, defining an internal aperture, and at least two spaced, angularly offset, parallel groups of parallel helically twisted cutting blades, extending across the aperture. The ring is configured to be placed in fluid communication with a hydraulic feed conduit of the water knife cutting system and for rotary motion about a rotational axis extending through the aperture. The groups of parallel blades are oriented generally perpendicular to the rotational axis. Each cutting blade has a sharpened cutting edge at one side thereof and is twisted generally about a center point thereof to define a pair of cutting edges oriented in opposite-facing circumferential directions. A vegetable product, fed through the aperture at a product speed, and with the rotary knife fixture rotating at a rotational speed, is substantially simultaneously cut into multiple helically twisted pieces.

27 Claims, 15 Drawing Sheets

Related U.S. Application Data application No. 13/647,319, filed on Oct. 8, 2012, now Pat. No. 9,089,987.

(60) Provisional application No. 61/661,278, filed on Jun. 18, 2012, provisional application No. 61/546,035, filed on Oct. 11, 2011, provisional application No. 62/201,875, filed on Aug. 6, 2015.

(51) Int. Cl.

| | | |
|---|---|---|
| *B26D 7/26* | (2006.01) | |
| *B26D 3/11* | (2006.01) | |
| *B26D 3/26* | (2006.01) | |
| *B26D 1/28* | (2006.01) | |
| *B26D 5/20* | (2006.01) | |
| *A23P 30/10* | (2016.01) | |
| *A23L 19/12* | (2016.01) | |
| *B26D 1/00* | (2006.01) | |

(52) U.S. Cl.
CPC ............... *B26D 3/11* (2013.01); *B26D 3/26* (2013.01); *B26D 5/20* (2013.01); *B26D 7/0658* (2013.01); *B26D 7/2614* (2013.01); *A23V 2002/00* (2013.01); *B26D 2001/006* (2013.01); *B26D 2001/0053* (2013.01); *B26D 2001/0073* (2013.01); *Y10T 83/6472* (2015.04); *Y10T 83/8789* (2015.04); *Y10T 83/8796* (2015.04); *Y10T 83/9372* (2015.04)

(58) Field of Classification Search
CPC .......... B26D 3/26; B26D 5/20; B26D 7/0658; B26D 7/2614; B26D 7/2628; A23L 19/12; A23P 30/10; A23V 2002/00; Y10T 83/6472; Y10T 83/8759; Y10T 83/8796; Y10T 83/9372
USPC .............................. 83/402, 22, 932
See application file for complete search history.

(56) References Cited

U.S. PATENT DOCUMENTS

| | | | |
|---|---|---|---|
| 1,494,102 A * | 5/1924 | Cramer | B01F 7/24 366/318 |
| 2,033,700 A * | 3/1936 | Geiger | B26D 7/2614 83/751 |
| 2,460,111 A | 1/1949 | Worthington | |
| 2,514,609 A * | 7/1950 | Roy | B23D 51/14 30/513 |
| 2,571,300 A * | 10/1951 | Offenhauser | B01F 7/00391 241/101.8 |
| 3,299,924 A | 1/1967 | Rudolf | |
| 4,372,184 A * | 2/1983 | Fisher | B26D 3/185 83/102 |
| 4,387,111 A * | 6/1983 | Mullender | A23G 3/50 426/512 |
| 4,393,737 A | 7/1983 | Shibata | |
| 4,911,045 A | 3/1990 | Mendenhall | |
| 5,046,388 A * | 9/1991 | Mendenhall | B26D 1/0006 83/24 |
| 5,095,794 A * | 3/1992 | Mendenhall | B26D 1/0006 83/402 |
| 5,097,735 A | 3/1992 | Mendenhall | |
| 5,167,177 A | 12/1992 | Cimperman et al. | |
| 5,167,178 A | 12/1992 | Cimperman et al. | |
| 5,168,784 A | 12/1992 | Foster et al. | |
| 5,174,181 A | 12/1992 | Julian et al. | |
| 5,179,881 A | 1/1993 | Frey et al. | |
| 5,224,409 A * | 7/1993 | Cimperman | B23Q 11/126 83/102 |
| 5,277,546 A | 1/1994 | Frey et al. | |
| 5,293,803 A | 3/1994 | Foster | |
| 5,343,623 A * | 9/1994 | Cole | B26D 1/0006 30/299 |
| 5,343,791 A * | 9/1994 | Julian | B26D 1/29 83/402 |
| 5,385,074 A * | 1/1995 | Burch, Jr. | B26D 3/11 198/625 |
| 5,394,780 A | 3/1995 | Foster et al. | |
| 5,394,793 A * | 3/1995 | Julian | B26D 3/11 83/402 |
| 5,421,226 A | 6/1995 | Mendenhall | |
| 5,473,967 A | 12/1995 | Frey et al. | |
| 5,655,428 A | 8/1997 | Cockburn et al. | |
| 5,806,397 A | 9/1998 | Mendenhall | |
| 5,904,083 A | 5/1999 | Jensen et al. | |
| 5,992,287 A * | 11/1999 | Dube | B26D 3/11 241/282.2 |
| 6,047,625 A | 4/2000 | Mendenhall | |
| 6,216,350 B1 * | 4/2001 | Kirk | B23D 49/008 30/507 |
| RE38,149 E | 6/2003 | Dube et al. | |
| 6,725,765 B1 * | 4/2004 | Mendenhall | B26D 1/0006 83/402 |
| 6,799,495 B2 | 10/2004 | Jensen | |
| 6,923,104 B2 | 8/2005 | Jensen | |
| 6,955,110 B1 | 10/2005 | Spletzer et al. | |
| 7,137,325 B2 * | 11/2006 | Bajema | B26D 1/0006 83/369 |
| 7,513,450 B2 * | 4/2009 | Young | B26D 1/0006 241/282.1 |
| 7,721,637 B2 | 5/2010 | Bucks | |
| 2001/0042428 A1 | 11/2001 | Jensen | |
| 2003/0072835 A1 | 4/2003 | Weinstein et al. | |
| 2004/0031255 A1 | 2/2004 | Kenny | |
| 2005/0102843 A1 * | 5/2005 | Jiang | A01D 34/53 30/240 |
| 2006/0283339 A1 | 12/2006 | Jensen et al. | |
| 2013/0087032 A1 | 4/2013 | Walker et al. | |

OTHER PUBLICATIONS

International Searching Authority; International Search Report and Written Opinion dated Nov. 15, 2016, PCT Application No. PCT/US2016/045172.

European Patent Office; Extended European Search Report for European Patent Application No. 17159568.9 dated May 22, 2017.

* cited by examiner

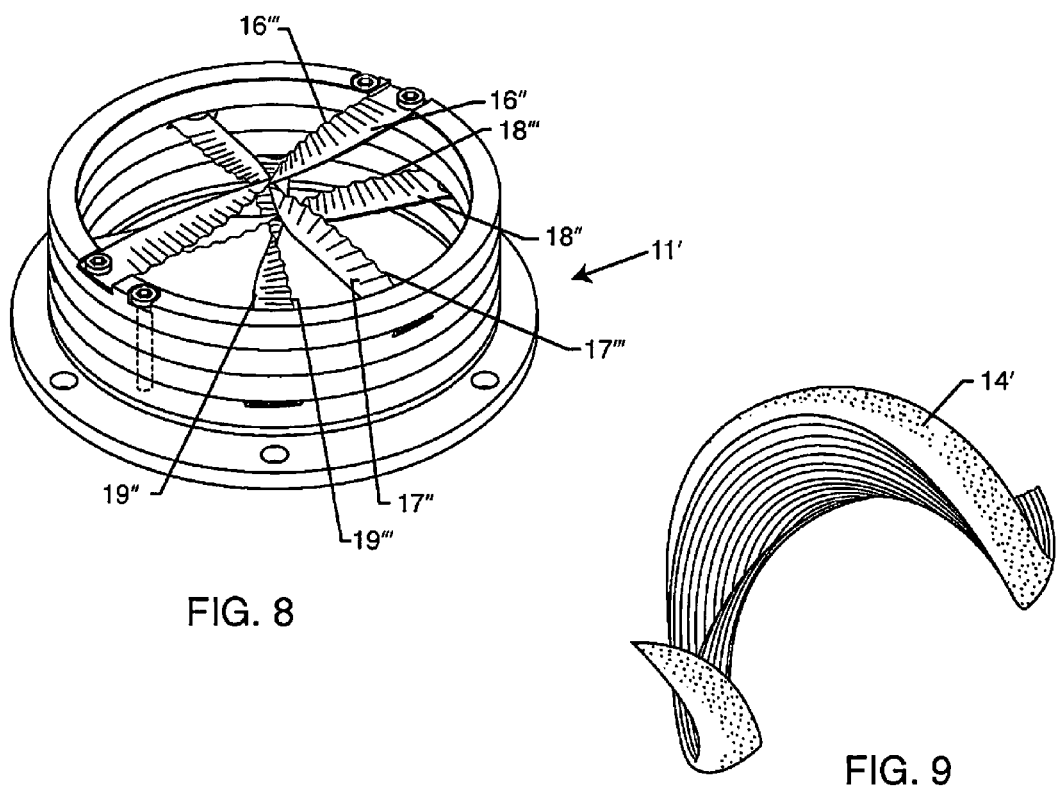
FIG. 8
FIG. 9
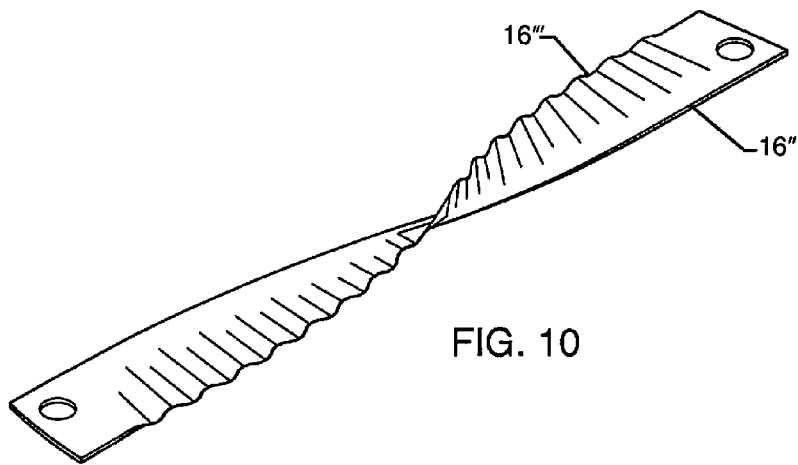
FIG. 10

SYSTEM FOR CUTTING SPIRAL SHAPED PIECES

CROSS-REFERENCE TO RELATED APPLICATIONS

This application claims the benefit of U.S. Provisional Patent Application Ser. No. 62/201,875, filed on Aug. 6, 2015 and entitled "System for Cutting Spiral Shaped Pieces," which is a continuation-in-part of U.S. patent application Ser. No. 14/712,857, filed on May 14, 2015 and entitled "Rotary Knife Fixture for Cutting Spiral, Textured Potato Pieces," which is a continuation of U.S. patent application Ser. No. 13/647,319, filed on Oct. 8, 2012 and entitled "Rotary Knife Fixture for Cutting Spiral, Textured Potato Pieces," now U.S. Pat. No. 9,089,987, which claims the benefit of U.S. Provisional Patent Application Ser. No. 61/661,278, filed on Jun. 18, 2012 and entitled "Rotary Knife Fixture for Cutting Spiral, Textured Potato Pieces," and claims the benefit of U.S. Provisional Patent Application Ser. No. 61/546,035 filed on Oct. 11, 2011 and entitled "Rotary Knife Fixture for Cutting Spiral Potato Pieces," the contents of all of which are incorporated herein by reference in their entireties.

FIELD OF THE DISCLOSURE

The present disclosure relates to devices and methods for cutting products, such as vegetable products. More particularly, the present disclosure relates to a device and method for simultaneously cutting an entire product, such as a potato, into helically twisted pieces having a selected cross-sectional shape.

BACKGROUND

Production cutting systems and related knife fixtures are useful for cutting vegetable products such as raw potatoes into spiral or helical shaped pieces, preparatory to further production processing steps such as blanching and par-flying. In this regard, one typical production system comprises a hydraulic cutting system wherein a so-called water knife fixture is mounted along the length of an elongated tubular conduit. A pumping device is provided to entrain the vegetable product such as raw potatoes within a propelling water flume for cutting engagement with knife blades of the water knife fixture. The vegetable product is pumped one at a time in single file succession into and through the water conduit with a velocity and sufficient kinetic energy to carry the vegetable product through a relatively complex knife fixture which includes at least one rotary cutting blade for severing the product into a plurality of smaller pieces of generally spiral or helical shape. The cut pieces are then carried further through a discharge conduit for appropriate subsequent processing, including cooking or blanching, par-frying, freezing and packaging steps, for subsequent finish processing and serving to customers as loops, twirls, curly fries, etc.

Examples of such hydraulic cutting systems and related rotary knife fixtures are found in U.S. Pat. Nos. 5,168,784; 5,179,881; 5,277,546; 5,343,791; 5,394,780; 5,394,793; 5,473,967; 5,992,287; and Re. 38,149, all of which are incorporated by reference herein. Persons skilled in the art will recognize and appreciate that mechanical production feed systems may be employed in lieu of hydraulic feed systems, as described in U.S. Pat. Nos. 5,097,735; 5,167,177; 5,167,178; and 5,293,803, which are also incorporated by reference herein.

The present invention is directed to an improved rotary knife fixture and related cutting blades for cutting raw vegetable products, such as potatoes, into spiral shaped pieces that may or may not have textured cut surfaces, such as crinkles, waves, or other designs.

SUMMARY

In accordance with the invention, a rotary knife fixture is provided for cutting vegetable products such as raw potatoes into spiral shapes. The knife fixture comprises a circular or ring-shaped blade holder adapted to be rotatably driven at a selected rotational speed within a hydraulic product flow path. The blade holder carries at least one cutting blade rotated therewith, wherein the blade is twisted from a generally longitudinally aligned center axis outwardly in opposite radial directions with a sharpened leading edge set at a desired pitch angle. By controlling the pitch of the blade in relation to the rotational speed of the blade and the velocity at which the potato travels along the hydraulic flow path, the resultant spiral cut shape is selected. By using multiple cutting blades at known axially spaced positions and selecting the angular position of each cutting blade in succession, the number of spiral shapes cut from each potato is also selected.

In one preferred form, the ring-shaped blade holder of the rotary knife fixture is rotatably driven within a vegetable product flow path, such as along a hydraulic flow conduit having raw vegetables such as potatoes carried in single file there through. The blade holder supports at least one cutting blade which is twisted from a generally longitudinally aligned center axis outwardly in opposite radial directions, and defining a pair of sharpened cutting edges presented in opposite circumferential directions. Each half of the cutting blade is set at a selected pitch angle which varies according to specific radial position, per the formula:

$$\text{Pitch Angle} = \text{ArcTan}(2 \times \text{Pi} \times \text{Radius}/\text{Pitch Length}) \quad (1)$$

For a blade diameter equal to 4 inches (radius=2 inches), and a pitch length equal to 3 inches, each cutting blade is anchored at its outer edge on the associated ring-shaped blade holder at an angle of about 76.6°. However, note that the specific pitch angle will vary according to radial position along the blade and the pitch length.

In use, the single cutting blade is rotatably driven, in a preferred form, at a rotational speed of about 6,000 revolutions per minute (rpm), to cut each potato traveling along the hydraulic flow conduit at a velocity of about 25 feet per second (fps) into a pair of generally spiral shaped pieces. With a pitch length of about 3 inches potato travel per cutting blade revolution, this results in substantially optimum cutting of each potato. In one embodiment, a cutting blade is rotatably driven at a rotational speed anywhere from about 4,000 rpm to 8,000 rpm. In one embodiment, a cutting blade is rotatably driven at a rotational speed anywhere from about 4,000 rpm, about 5,000 rpm, about 6,000 rpm, about 7,000 rpm, or about 8,000 rpm, or at revolutions greater than 8,000 rpm.

When more than one cutting blade is used, each of the cutting blades may be physically supported in a stack of ring-shaped blade holders having a known axial dimension such as about 0.5 inch per blade holder, with the multiple blade holders being fixed for rotation together. With this configuration, the angle θ (theta) separating each of the supported cutting blades in succession is given by the formula:

$$\theta = T/P(\text{axial dimension of each blade holder/pitch length}) \times 360° + 360°/N(\text{number of cut pieces}). \quad (2)$$

Following this formula, when two cutting blades are used, each carried by a 0.5 inch thick ring-shaped blade holder (thickness=T), with a pitch length (pitch=P) of 3 inches, a total of four spiral pieces are cut from each product, and the second cutting blade is rotationally set to lag the first cutting blade by 150°. Similarly, where three cutting blades are used, each product is cut into a total of six spiral pieces, and the second blade is oriented to lag the first blade by 120°, and the third blade is oriented to lag the second by an additional 120°, or a total lag from the first blade of about 240°. And, where four cutting blades are used, each product is cut into a total of eight spiral pieces, and the four blades are oriented respectively to lag the immediately preceding blade by about 105°.

Accordingly, the present invention encompasses a configuration of multiple blades to produce 2, 4, 6, 8, or more spiral pieces per product. In addition to even numbers of spiral pieces cut per product, the present invention encompasses a configuration of blades that produce 3, 5, 7, 9 or more spiral pieces per product. An example of such a spiral piece is shown in D640,036, which is incorporated herein by reference.

A further aspect of the present invention is a cutting blade designed to have a textured or "crinkled" surface edge so that when it cuts the product, the exposed cut surface is similarly textured or crinkled. Accordingly, in one embodiment crinkle-cut spiral pieces of product can be produced using the inventive blades and cutting system.

In any embodiment, or permutation, of cutting blades and number of cutting blades in the inventive cutting system, any number of spiral pieces can be obtained per product. That is 2, 3, 4, 5, 6, 7, 8, 9, or 10, or more than 10 spiral pieces may be cut from each product. In another embodiment any number or all of the cutting blades may be textured or crinkled to produce textured or crinkled cut surfaces on a spiral piece. Thus, in one embodiment every spiral piece cut from one product may contain at least one crinkle-textured cut surface if every cutting blade in the cutting system has a crinkled surface edge. However in another embodiment not every cutting blade in the cutting system has a wavy, textured, or crinkled edge. Thus, in that instance, a single product may be cut to yield smooth surface spiral pieces as well as crinkle-cut spiral pieces.

By "product" is meant any vegetable or fruit or wood. A vegetable that may be cut into 2, 3, 4, 5, 6, 7, 8, 9, 10, or more than 10 spiral pieces that may have smooth or textured/crinkled surfaces, includes, but is not limited to, any tuberous vegetable, beets, turnips, radish, leeks, or any root vegetable. In one embodiment, a tuber is a potato, sweet potato, carrot, cassava, swede, or yam. A fruit that may be cut into 2, 3, 4, 5, 6, 7, 8, 9, 10, or more than 10 spiral pieces that may have smooth or textured/crinkled surfaces, includes, but is not limited to, apples, squash, bell peppers, pumpkin, zucchini, cucumber, mangos, and plantains. A vegetable or fruit when it is processed and cut according to the methods disclosed herein does not necessarily have to be whole. That is, chunks or cut pieces of a vegetable may be pumped into the cutting system and those chunks or pieces subsequently cut with cutting blades to produce spiral pieces or spiral fragments.

The present invention in particular encompasses a new french fry that is spiral-cut and which may have smooth or crinkled surfaces. See, for instance, the spiral potato pieces shown in FIG. 9. The types of spiral-cut potato wedges are a new line of edible products, and can be made in different sizes or textured or smooth surfaces according to the present invention. Thus one embodiment of the present invention is a package containing multiple spiral-cut potato pieces or wedges wherein substantially all the spiral cut pieces or wedges are about the same or similar size to each other. In another embodiment of the present invention is a package containing multiple spiral-cut potato pieces or wedges wherein many of the spiral cut pieces or wedges are about the same or similar size to each other. A "package" may be a bag of the sort used to hold chips, or an open holder such as to hold fast-food french fries, or any such containment structure or vessel. In any of these embodiments, one or more or all of the spiral cut potato pieces or wedges in a package may have a crinkle-cut surface. In another embodiment, the spiral cut potato pieces or wedges in the package may be raw or may be cooked, such as fried, roasted, or oven-baked. Accordingly, one embodiment of the present invention is a collection of spiral-cut potato pieces that are raw, a collection of spiral-cut potato pieces that are fried, or a collection of spiral-cut potato pieces that are oven-baked, or a collection of spiral-cut potato pieces that are roasted, wherein the pieces have smooth surfaces or have a crinkle-cut surface. By "smooth" surface is meant a spiral cut product that has been cut with a cutting blade that has a flat, untextured, surface and edge. By "crinkle-cut" is meant a spiral cut product that has been cut with a cutting blade that has a crinkled or wavy surface and edge, such as those shown in FIG. 10. In a further embodiment, the spiral-cut potato wedges may be further processed or seasoned, such as to produce battered or beer battered spiral-cut fried or oven-baked potato wedges.

Pieces of wood may also be cut into 2, 3, 4, 5, 6, 7, 8, 9, 10, or more than 10 spiral pieces that may have smooth or textured/crinkled surfaces. Softwoods could be cut according to the present invention, for instance. Examples of softwood include but are not limited to pine, redwood, fir, cedar, and larch. Other materials may be cut according to the present invention too, such as polystyrene, foam, solid paper pulp materials, and plastics.

In accordance with one aspect thereof, the present disclosure provides a rotary knife fixture configured for use in a water knife cutting system. The rotary knife fixture includes a ring, defining an internal aperture, and at least two spaced, angularly offset, parallel groups of parallel blades, extending across the aperture. The ring is configured to be placed in fluid communication with a hydraulic feed conduit of the water knife cutting system and for rotary motion about a rotational axis extending through the aperture. The groups of parallel blades are oriented generally perpendicular to the rotational axis. Each cutting blade has a sharpened cutting edge at one side thereof and is twisted generally about a center point thereof to define a pair of cutting edges oriented in opposite-facing circumferential directions. A vegetable product, fed through the aperture at a product speed, and with the rotary knife fixture rotating at a rotational speed, is substantially simultaneously cut into multiple helically twisted pieces.

In accordance with another aspect thereof, the present disclosure provides a system for cutting products propelled into cutting engagement therewith at a selected speed. The system includes a blade holder, configured to rotate about a rotational axis, a drive motor, configured to rotatably drive the blade holder at a selected rotational speed, and a hydraulic feed system, configured to feed products through the aperture at a selected linear speed while the blade holder is rotating. The blade holder includes a generally ring-shaped aperture, surrounding the rotational axis, and at least two parallel, spaced, angularly offset groups of generally parallel cutting blades, carried by the blade holder and extending across the aperture. Each cutting blade has a sharpened cutting edge at one side thereof, and is twisted generally about a center point thereof to define a pair of cutting edges oriented in opposite-facing circumferential directions. The system substantially simultaneously cuts the product into multiple helically twisted pieces.

In accordance with another aspect thereof, the present disclosure provides a water knife cutting system for cutting potatoes into multiple helically twisted pieces. The water knife cutting system includes a hydraulic feed system, configured to propel potatoes through a feed conduit at a selected linear speed, a drive motor; and a cutting head, having a rotatable blade holder, driven by the drive motor and configured to rotate about a rotational axis. The rotatable blade holder includes a generally ring-shaped aperture, in fluid communication with the feed conduit and surrounding the rotational axis, and at least two parallel, spaced, angularly offset groups of generally parallel cutting blades, carried by the blade holder and extending across the aperture. Each cutting blade has a sharpened cutting edge at one side thereof and is twisted generally about a center point thereof to define a pair of cutting edges oriented in opposite-facing circumferential directions. The groups of blades are configured to contact and substantially simultaneously cut the potatoes into a plurality of helically twisted pieces.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 8 is a drawing similar to FIG. 7 but showing four corrugated or crinkle cut knife blades;

FIG. 9 is a drawing showing a spiral piece or wedge cut with the crinkle cut knife blades shown in FIG. 8;

FIG. 10 is a drawing of an exemplary cutting blade designed to have textured or wavy or crinkled surfaces and edges so as to produce spiral pieces or wedges that have similarly textured, wavy, or crinkled cut surfaces;

Figure 1:
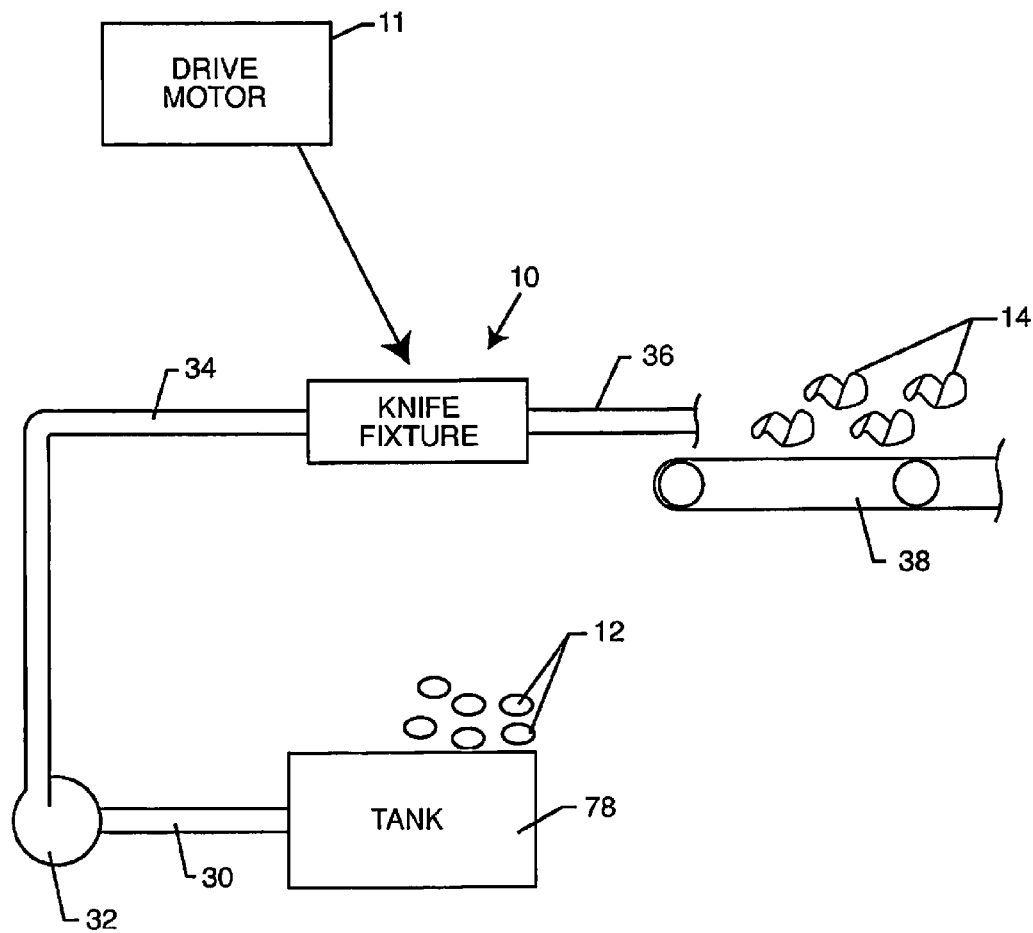
FIG. 1 is a schematic diagram depicting a hydraulic cutting system of a type utilizing a rotatably driven knife fixture constructed in accordance with the present invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

This invention relates generally to devices and methods for cutting food products, such as vegetable products, and particularly such as raw potatoes and the like, into spiral or helical shaped pieces, whose cut surfaces may be patterned by the design of knife blades, such as to create "crinkle-cut" spiral or helical pieces.

More particularly, this invention relates to a rotatably driven knife fixture having a selected number of knife blades adapted to cut a raw potato or the like into generally spiral shaped pieces.

As shown in the exemplary drawings, a hydraulic cutting system comprises a conventional so-called water knife fixture referred to generally in FIG. 1 by the reference numeral 10 for cutting vegetable products such as whole potatoes 12 into spiral shaped pieces 14 for subsequent processing. The present invention comprises a rotary driven knife fixture 10 (FIGS. 2-7) for installation into the cutting system and for rotatable driving by means of a drive motor 11 or the like. The knife fixture 10 includes at least one rotatably driven cutting blade 16 (FIGS. 2-4) for cutting the product into a pair of generally spiral shaped pieces 14 of the same or similar size and shape. In alternative embodiments, the single cutting blade 16 can be combined with a second cutting blade 17 (FIG. 5) to cut the product into four spiral shaped pieces, with a third cutting blade 18 (FIG. 6) to cut the product into six spiral shaped pieces, or with a fourth cutting blade 19 (FIG. 7) to cut the product into eight spiral shaped pieces. Indeed, any number of cutting blades can be used for subdividing the product into twice the number of spiral shaped pieces of substantially similar size and shape.

FIG. 1 shows the cutting system in the form of a hydraulic cutting system comprising a tank 78 or the like for receiving a supply of vegetable products, such as the illustrative raw whole potatoes 12 in a peeled or unpeeled state. Alternatively, these potatoes 12 can comprise halves or pieces of whole potatoes, peeled or unpeeled. In one preferred form, these potatoes 12 comprise relatively small potatoes or potato pieces having a longitudinal length on the order of about 3 inches. It is noted, however, that actual potato size is unimportant, as long as the potato has a diametric size to fit through the knife fixture.

As viewed in FIG. 1, the potatoes 12 are delivered via an inlet conduit 30 to a pump 32 which propels the potatoes in single file relation within a propelling water stream or flume through a tubular delivery conduit 34 into cutting engagement with the blades (not shown in FIG. 1) of the water knife fixture 10. In a typical hydraulic cutting system, the potatoes are propelled through the delivery conduit 34 at a relatively high velocity of about 25 feet per second (fps), or about 1,500 feet per minute (fpm), to provide sufficient kinetic energy whereby each potato is propelled through the knife fixture 10 to produce (as will be described in more detail herein, per the blade pitch angle) the desired elongated spiral cut pieces 14. In this regard, the delivery conduit 34 may include a centering alignment device (not shown) for substantially centering each potato 12 on a longitudinal centerline of the flow passage extending through the associated knife fixture 10, in a manner known to persons skilled in the art. The cut strips 14 travel through a short discharge conduit 36 to a conveyor 38 or the like which transports the cut strips 14 for further processing, such as blanching, drying, batter coating, par-frying, freezing, etc.

Persons skilled in the art will recognize and appreciate that alternative form cutting systems may be used, to include, by way of example, mechanical cutting systems wherein the vegetable products such as potatoes are mechanically delivered via a chute or hopper or the like to the knife fixture 10. In either case, the knife fixture 10 is mounted along a production path and is rotatably driven for engaging and cutting the incoming products into the desired spiral shaped pieces.

Figure 2:
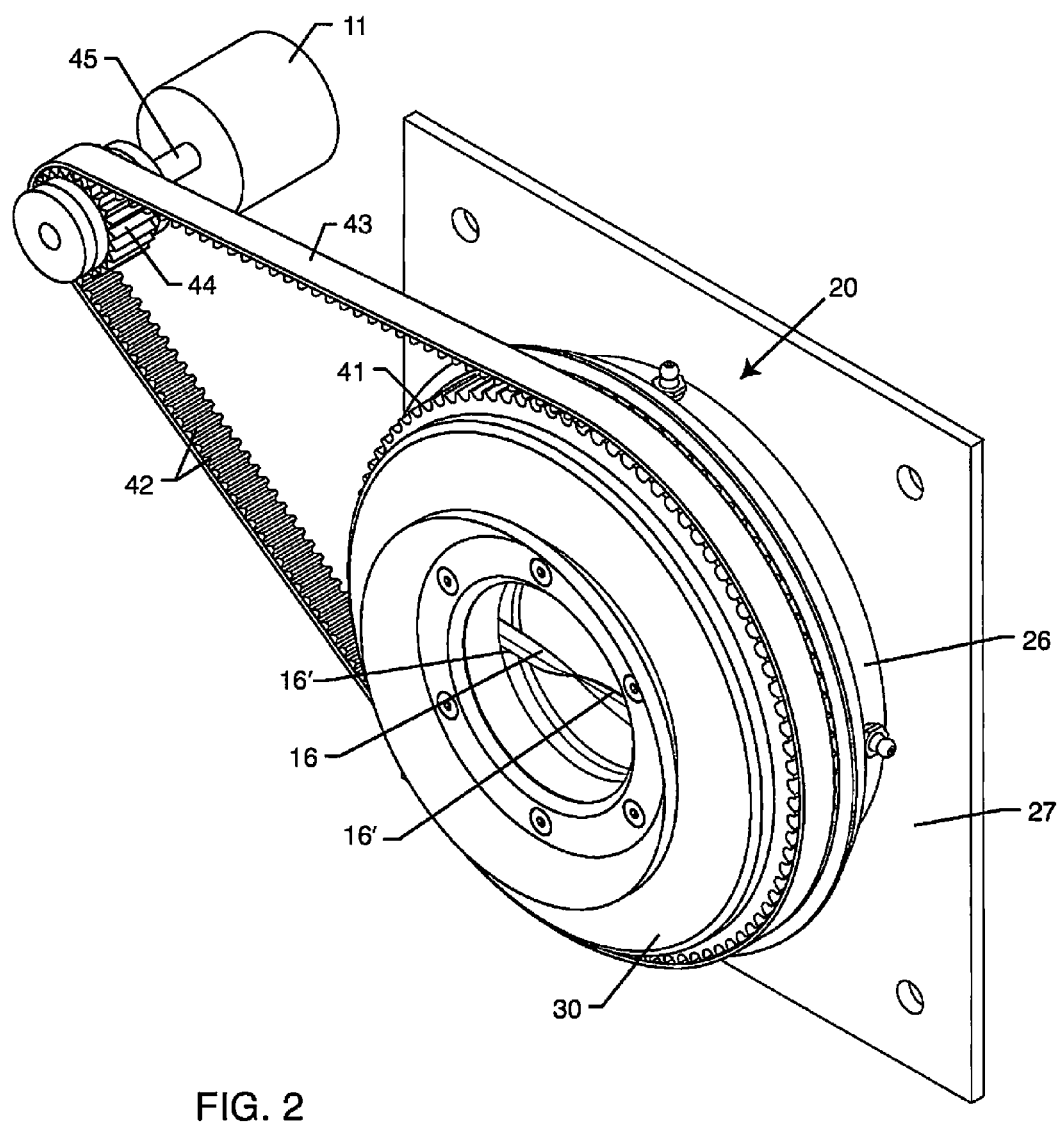
FIG. 2 is an enlarged perspective view illustrating a drive motor and cog belt for rotatably driving the knife fixture of FIG. 1.
Figure 3:
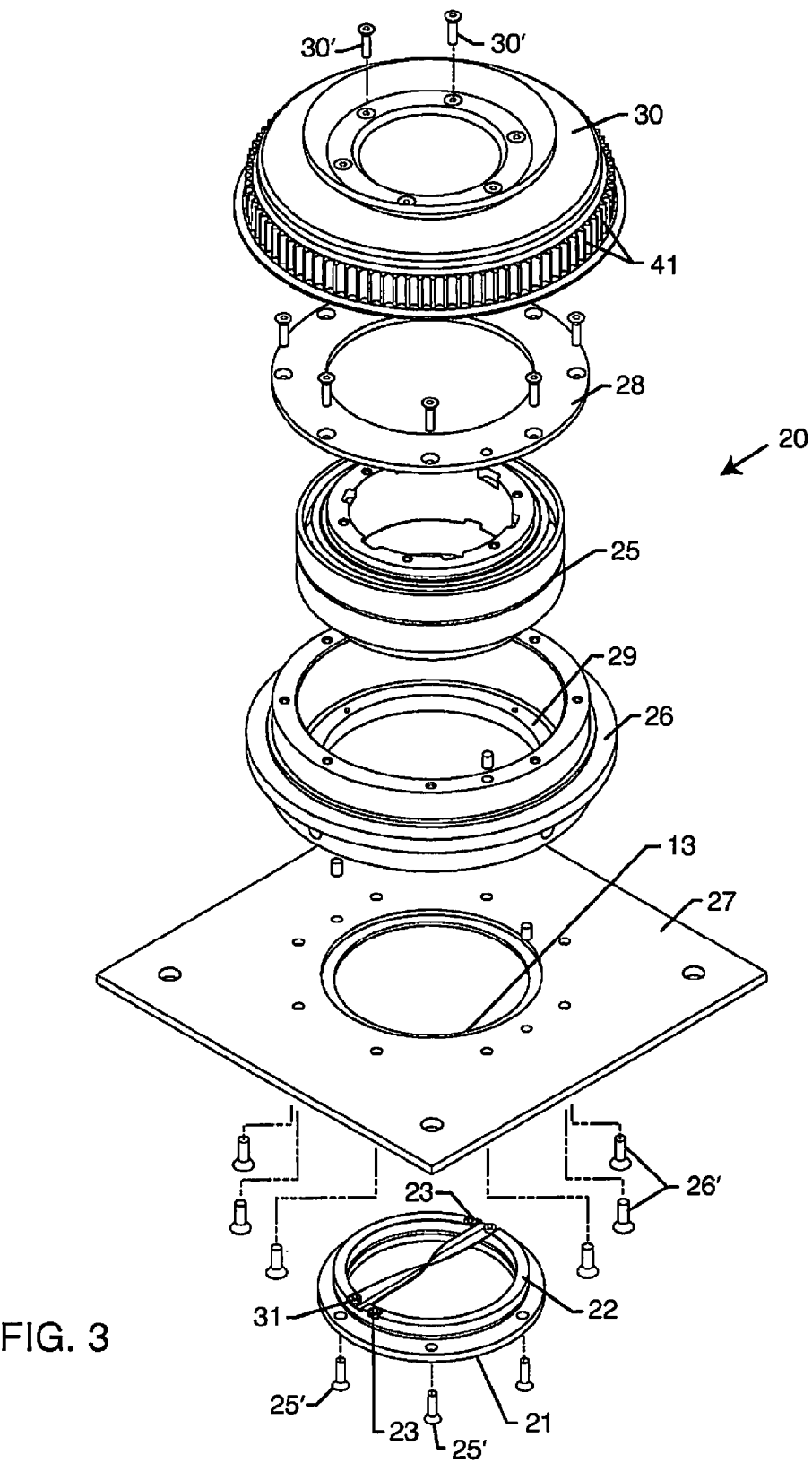
FIG. 3 is an exploded perspective view showing rotatable mounting of the knife fixture within a rotary bearing unit.

FIGS. 2-3 show installation of the illustrative knife fixture 10 into a rotary bearing unit 20 in a position in-line with a production path for the vegetable products such as the potatoes 12 (FIG. 1). In this regard, the illustrative knife fixture 10 comprises a generally ring-shaped blade holder 22 of generally annular or circular shape, and having a cross sectional area sufficient for providing a relatively stiff or sturdy structure capable of withstanding the rigors of a production environment over an extended period of time. This blade holder 22 is secured as by means of clamp screws 23 or the like onto downstream or lower annular ring 21 or the like adapted in turn for affixation to the lower or downstream end of a rotatable bearing assembly 25 as by means of screws 25' or the like.

As shown in FIG. 3, the bearing assembly 25 is rotatably carried within a bushing 26 mounted as by means of screws 26' or the like onto an upstream or upper side of the enlarged plate 27, which has an opening 13 formed therein for in-line installation along the production flow path. A flange plate 28 overlies the bearing assembly 25 for sandwiching the assembly 25 against an internal shoulder 29 within the bushing 26. A driven ring BO is mounted in turn as by means of screws 30' onto the bearing assembly 25 for rotation therewith.

The driven ring 30 of the rotary bearing unit 20 includes a circumferential array of detents 41 for registry with teeth 42 of a cog-type drive belt 43 (FIG. 2). This drive belt 43 is in turn reeved about a drive gear 44 on an output shaft 45 of the drive motor 11 (FIG. 2). Accordingly, the drive motor 11 positively drives the driven ring 30 and associated bearing assembly 25 secured thereto at a known speed, preferably on the order of about 6,000 rpm in the case of the illustrative hydraulic cutting system, for correspondingly rotatably driving the knife fixture 10 at the same rotational speed. Importantly, the cog-type drive belt 43 beneficially insures constant-speed rotatable driving of the knife fixture 10 notwithstanding periodic impact engagement of the water-propelled potatoes therewith.

Figure 4:
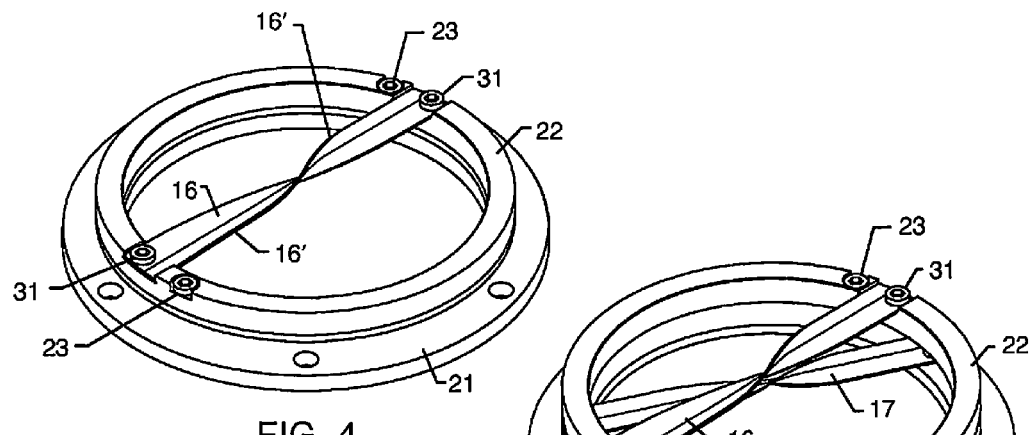
FIG. 4 is a front side perspective view of one cutting blade carried by a ring-shaped blade holder in accordance with one preferred form of the invention.

In one preferred configuration as viewed in FIGS. 2-4, a single cutting blade 16 is used to cut each incoming vegetable product such as a potato 12 into two separate, generally spiral shaped pieces 14 (FIG. 1) of similar size and shape. The cutting blade 16 is shown with a sharpened cutting edge 16' along one side thereof. Since the cutting blade 16 is twisted generally at a radial center, or a longitudinal centerline or axis of the hydraulic flow path, two cutting edges 16' are defined to extend radially outwardly in opposite directions, and in opposite-facing circumferential directions. A pair of clamp screws 31 or the like are secured through the respective opposite ends of the cutting blade 16 to seat the cutting blade within a shallow recess formed at an appropriate pitch angle.

More specifically, the specific pitch angle of the cutting blade 16 at each specific point along its radial length is given by the formula:

$$\text{Pitch Angle} = \text{ArcTan}(2 \times \text{Pi} \times \text{Radius}/\text{Pitch Length}) \tag{1}$$

For a total blade radius of 2 inches, and a pitch length of about 3 inches, the clamp screws 31 secure the outermost radial ends of each cutting blade 16 or 17 at a pitch angle of about 76.6° to the axial blade centerline. It will be understood, however, that the specific pitch angle is a function of radius as defined in equation (1) above. The pitch angle increases from the radial center, and it is this pitch angle that determines the spiral shape of the cut product.

If more spiral shaped pieces 14 are desired from each potato 12, more cutting blades are used recognizing that each of the cutting blades cuts the incoming product in two, and thereby produces twice the number of spiral shaped pieces in comparison with the number of cutting blades used. Importantly, the cutting blades are arranged in succession at controlled angles to obtain similar or virtually identical cut spiral shaped pieces.

Figure 5:
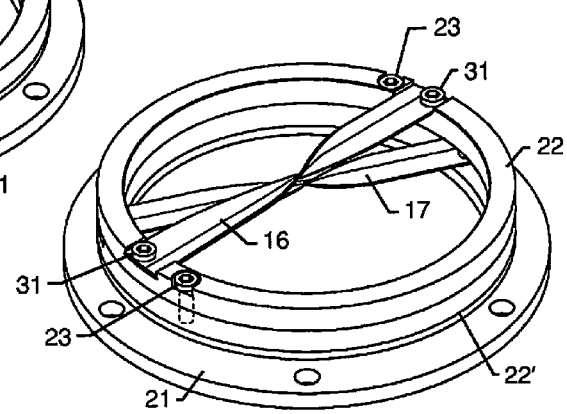
FIG. 5 is a front side perspective view of a pair of cutting blades carried respectively by a corresponding pair of blade holders in accordance with one alternative preferred form of the invention.

More particularly, in one preferred form as viewed in FIG. 5, two cutting blades 16 and 17 are supported by separate blade holders 22 and 22' in a stack on the associated annular ring 21, as by means of elongated screws 23. That is, aligned screw ports are formed in the second blade holder 22' at the appropriate positions for receiving the elongated screws 23 used to fasten the drive rings 22, 22' and the underlying annular ring 21 together for concurrent rotation.

The two cutting blades 16 and 17 are generally identical to each to each other, to include a twisted shape generally at a longitudinal center axis thereof and extending radially outwardly in opposite directions for seated engagement as by means of clamp screws 31 or the like at the selected pitch angle. Using formula (1) above for the specific pitch angle of each blade 16 or 17 along its radial length, and wherein the total blade radius is 2 inches and the pitch length is 3 inches, the clamp screws 31 secure the outermost radial ends of each cutting blade 16 or 17 at a pitch angle of about 76.6°.

In addition, when the two cutting blades 16 and 17 are rotated at about 6,000 revolutions per minute (rpm), to advance each product to be cut along the hydraulic flow path at a velocity of about 25 feet per second (fps), the two cutting blades 16 and 17 both cut the incoming product into two pieces, for a total of four spiral shaped pieces 14 of similar or identical shape. With a pitch length of about 3 inches potato travel for each cutting blade revolution, and with each of the blade holders 22, 22' having an axial dimension of about 0.5 inch, the angle θ (theta) separating each of the supported cutting blades is given by the formula:

$$\theta = T/P(\text{axial dimension of each blade holder/pitch length}) \times 360° + 360°/N(\text{number of cut pieces}). \quad (2)$$

In the case of the two cutting blades 16, 17 adapted to cut each incoming product into four generally identical spiral shaped pieces, the angle $1=150°$.

Figure 6:
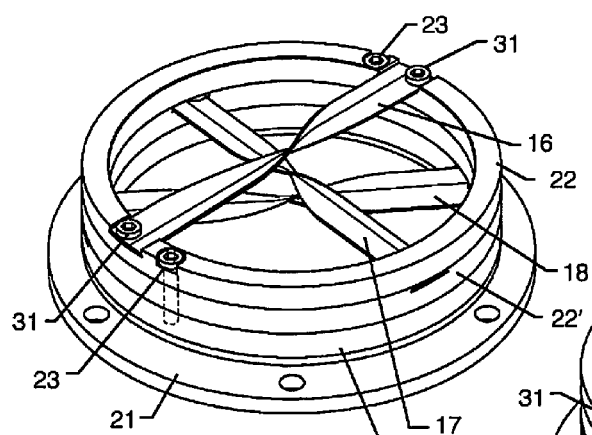
FIG. 6 is a front side perspective view of a knife fixture including three cutting blades respectively supported by three blade holders in accordance with a further alternative preferred form of the invention.
Figure 7:
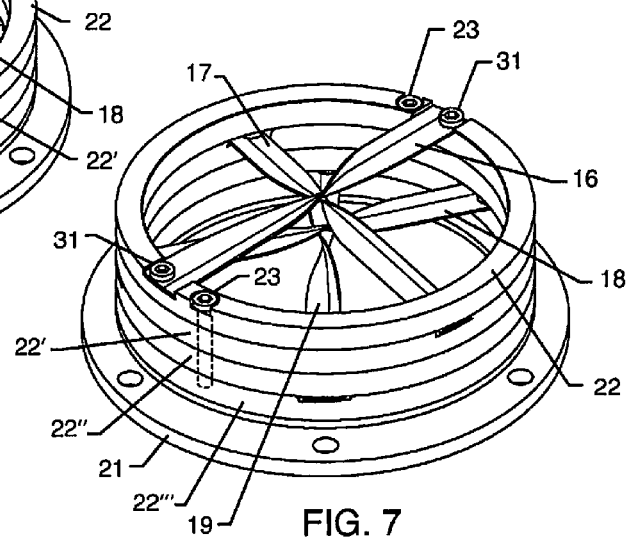
FIG. 7 is a front side perspective view of four cutting blades carried respectively by four blade holders in accordance with another alternative preferred form of the invention.

FIGS. 6 and 7 illustrate two exemplary alternative preferred forms of the invention, wherein three cutting blades 16, 17 and 18 are separately supported by a stack of three ring-shaped blade holders 22, 22', and 22" for cutting each incoming product into a total of six spiral shaped pieces (FIG. 6), and also wherein four cutting blades 16, 17, 18 and 19 are separately supported by a stack of four ring-shaped blade holders 22, 22', 22", and 22"' (FIG. 7) for cutting each incoming product into a total of eight spiral shaped pieces. In the examples of FIGS. 6 and 7, formula (2) is followed to determine the angular setting of each cutting blade in succession in order to form the multiple spiral shaped pieces of identical or similar shapes. In FIG. 6, the cutting blades are set at successive angles of about 120° to cut products per U.S. Pat. No. D640,036 which is incorporated by reference herein, whereas in FIG. 7, the cutting blades are set at successive angles of about 105°. In each case, clamp screws 31 are used to seat each of cutting blades at the selected pitch angle within the recess formed in the associated blade holder. Similarly, screws 23 or the like are fitted and secured through aligned ports formed in the stacked blade holders for securing them together for rotation with the bearing assembly 25.

Persons skilled in the art will understand and appreciate, of course, that virtually any number of cutting blades can be used, with the formula (2) determining the angular spacings of the multiple cutting blades in succession. For example, when five cutting blades are used, a total of ten spiral shaped pieces are formed; following formula (2), the successive cutting blade angular spacings would be about 96°. Similarly, when six cutting blades are used, a total of twelve spiral shaped pieces are formed; following formula (2), the successive cutting blade angular spacings would be about 90°. Persons skilled in the art will also appreciate that when three or more cutting blades are used, the formula (2) determines that angular spacings of the blades as a group, but that each of the blades need only be set at one of the angular positions; that is, the blades do not need to be set at a regular lag interval, so long as one of the blades in the group is set at each one of the angular positions.

Alternately, it will be understood that other forms of the blade holders and the related interconnection means can be employed, such as the formation of steps including interengaging tabs and slots in the respective blade holders to insure the desired angular position of the cutting blades and concurrent rotation thereof.

In an alternative preferred form, the present invention encompasses a new french fry that is spiral-cut and which may have corrugated or crinkled surfaces. See, for instance, the spiral potato pieces 14' shown in FIG. 9. The types of spiral-cut potato wedges are a new line of edible products, and can be made in different sizes or textured surfaces according to the present invention. Thus one embodiment of the present invention is a package containing multiple spiral-cut potato pieces or wedges 14' wherein substantially all the spiral cut pieces or wedges are about the same or similar size to each other. In another embodiment of the present invention is a package containing multiple spiral-cut potato pieces or wedges 14' wherein many of the spiral cut pieces or wedges are about the same or similar size to each other. A "package" may be a bag of the sort used to hold chips, or an open holder such as to hold fast-food french fries, or any such containment structure or vessel. In any of these embodiments, one or more or all of the spiral cut potato pieces or wedges in a package may have a crinkle-cut surface. In another embodiment, the spiral cut potato pieces or wedges in the package may be raw or may be cooked, such as fried, roasted, or oven-baked.

Accordingly, one embodiment of the present invention is a collection of spiral-cut potato pieces that are raw, a collection of spiral-cut potato pieces that are fried, or a collection of spiral-cut potato pieces that are oven-baked, or a collection of spiral-cut potato pieces that are roasted, wherein the pieces have smooth surfaces or have a crinkle-cut surface. By "smooth" surface is meant a spiral cut product that has been cut with a cutting blade 16, 17, 18 or 19 that has a flat, untextured, surface and edge, as viewed in FIGS. 4-7. By "crinkle-cut" is meant a spiral cut product that has been cut using a modified knife fixture 11' with a cutting blade 16", 17", 18", or 19" that has a crinkled or wavy surface and edge 16'", 17'", 18'", or 19'", such as those shown in FIG. 8. In a further embodiment, the spiral-cut potato wedges may be further processed or seasoned, such as to produce battered or beer battered spiral-cut fried or oven-baked potato wedges.

It will be understood, of course, that the modified knife fixture 11' shown in FIG. 8 can be equipped with one or more of the cutting knives of a corrugated and crinkle-cut configuration, as per any one of the knife blade embodiments depicted in FIGS. 4-7. Indeed, more than four such knife blades can be used, if more than 8 spiral-cut wedges are desired. It will also be recognized and understood that different size corrugations or crinkle-cut configurations can be used for the various knife blades, such as illustrated in FIG. 10 with respect to the corrugated knife blade 16", and the associated cutting edge 16'".

A variety of modifications and improvements in and to the rotary knife fixture 10 of the present invention will be apparent to those persons skilled in the art. As one example, persons skilled in the art will understand that each of the twisted cutting blades as shown and described herein can be replaced by a pair of individual blades aligned diametrically with each other and having a pitch angle as defined by formula (1), but otherwise unconnected at the axial centerline of the flow path. As a further alternative, the blades do not need to be aligned diametrically, but an odd number of unconnected blades can be used in the event that an odd number of product cuts is desired.

Figure 11:
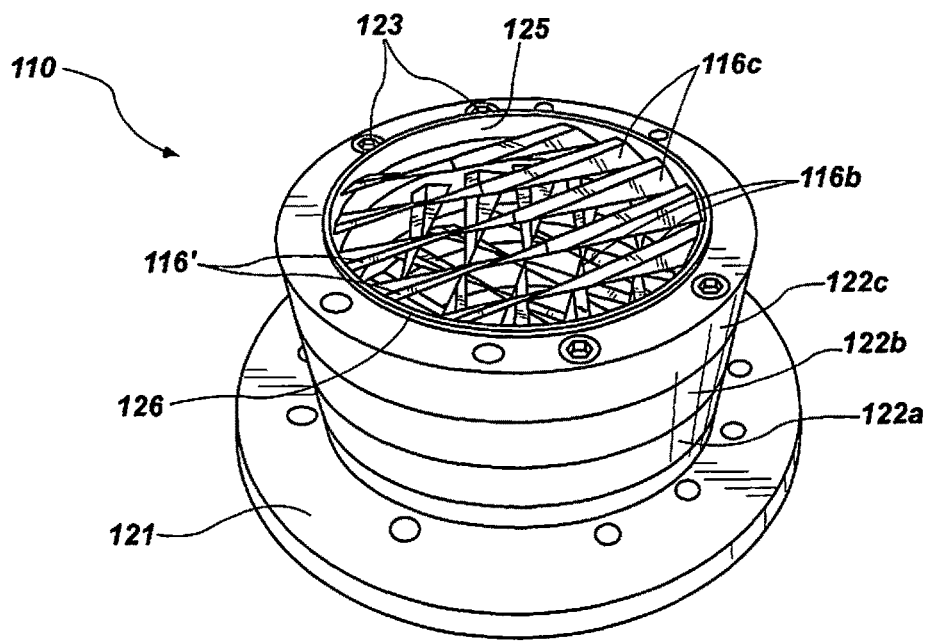
FIG. 11 is a perspective view of an embodiment of a knife fixture including three knife sets respectively supported by three blade holder rings for cutting twisted triangle pieces, in accordance with the present disclosure.

The rotary knife fixture disclosed herein can also be modified to cut twisted potato pieces in a different manner. Shown in FIG. 11 is a perspective view of another embodiment of a knife fixture 110 that includes multiple sets of parallel knives. An end view of the same is provided in FIG. 12. This knife fixture 110 is similar to those described above. The knife fixture generally includes a lower annular ring 121, on which are mounted a succession of blade holder rings, indicated generally at 122. The individual blade holder rings 122 have an annular shape and each define a central aperture that accommodates the hydraulic flow path of the water knife system and through which a vegetable product (e.g. a potato) can flow.

The annular rings 122 also each support a group of multiple parallel twisted knives or blades, indicated generally at 116. As described above with respect to the cutting blades 16 shown in FIGS. 2-8 and 10, the cutting blades 116 have a sharpened cutting edge 116' along one side thereof, and are twisted generally at a mid-point of the span of the blade. For illustrative purposes, the sharpened cutting edges 116' are indicated on only one exemplary blade 116 in FIGS. 11 and 12. Given this twisted configuration, two cutting edges 116' are defined to extend radially outwardly in opposite directions, and in opposite-facing circumferential directions. The helically twisted shape of the blades 116 can be mathematically defined in the manner described above.

Figure 12:
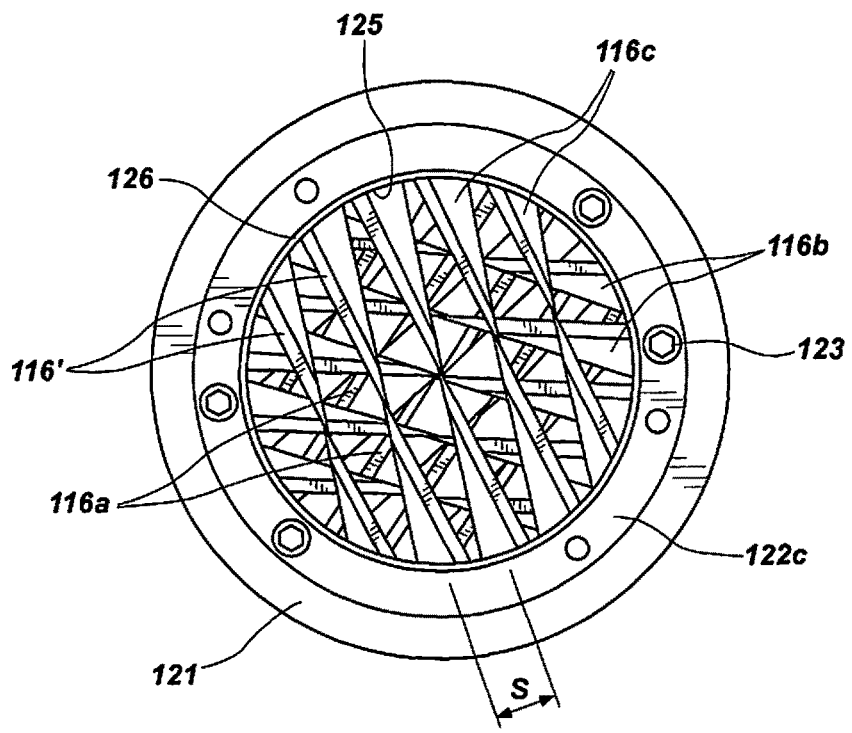
FIG. 12 is an end view of the knife fixture of FIG. 11.

As shown in FIGS. 11 and 12, the cutting blades 116 can be integrally attached to the inner cylindrical surface 125 of their respective ring 122, such as by welding. Alternatively, the cutting blades 116 can be affixed to the ring 122 with clamp screws, in the manner described above with respect to the embodiments shown in FIGS. 2-8. The angle of attachment of the ends of the blades (i.e. the angle of twist of any blade 116 at any point along its length relative to the center of the ring 122) can be mathematically determined in the manner described above. The blades 116 attached to each ring 122 are parallel to each other and separated by a spacing S, as shown in FIG. 12. This size of this spacing S can be selected to produce a desired size of twisted pieces, as discussed below.

It is to be understood that because the blades 116 are parallel to each other and span across a circular opening, the lengths of the blades 116 will vary depending upon their position relative to the curvature of the ring 122. As shown in FIGS. 11 and 12, where five blades 116 are provided in each blade set, one central blade 116 occupies the center and generally spans the diameter of the circular ring 122, while the other blades on either side of the central blade 116 generally define chords relative to the curvature of the ring 122, and have lengths that are some amount shorter than the central blade 116.

The knife fixture 110 shown in FIGS. 11 and 12 includes three sets or tiers of blades 116. As can be seen in FIG. 11, the knife fixture 110 includes a lower or first blade holder ring 122a, which is attached directly to the base ring 121, and supports a first group of blades 116a. The first group of blades 116a can be referred to as a first tier of blades. A second blade holder ring 122b is attached atop the first blade holder ring 122a, and supports a second group or tier of blades 116b. Similarly, a third blade holder ring 122c is attached atop the second blade holder ring 122b, and supports a third group or tier of blades 116c. Each blade holder ring 122 can be attached to the blade holder ring 122 below it or to the annular base 121, using screws 123, as shown in FIG. 11, or other suitable attachment device or method. Additionally, each blade holder ring 122 and the annular base 121 can include an integral annular flange 126 on one side, and a corresponding annular slot (not shown) on the opposite side, for facilitating stacked alignment of the circular blade holder rings 122 in a group.

The annular rings 122 have a uniform thickness, with the result that, when the rings 122 are stacked, each group of blades 116 is spaced a uniform distance from the next adjacent set of blades. In one embodiment, the blade holder rings 122 have a thickness of 0.5", thus providing a 0.5" spacing between blade sets. It should be understood, however, that this dimension can vary. A thickness of 0.5" is useful because it is a large enough dimension to provide space for sufficiently strong blades to cut potato. This dimension has proven to work well for stainless steel blades spanning a 3" to 4" circle cutting potatoes. Stronger blade material, softer product, or a smaller circle to span could reduce the desired or useful or minimum tier height. However, changes of an opposite nature could increase it.

Figure 13:
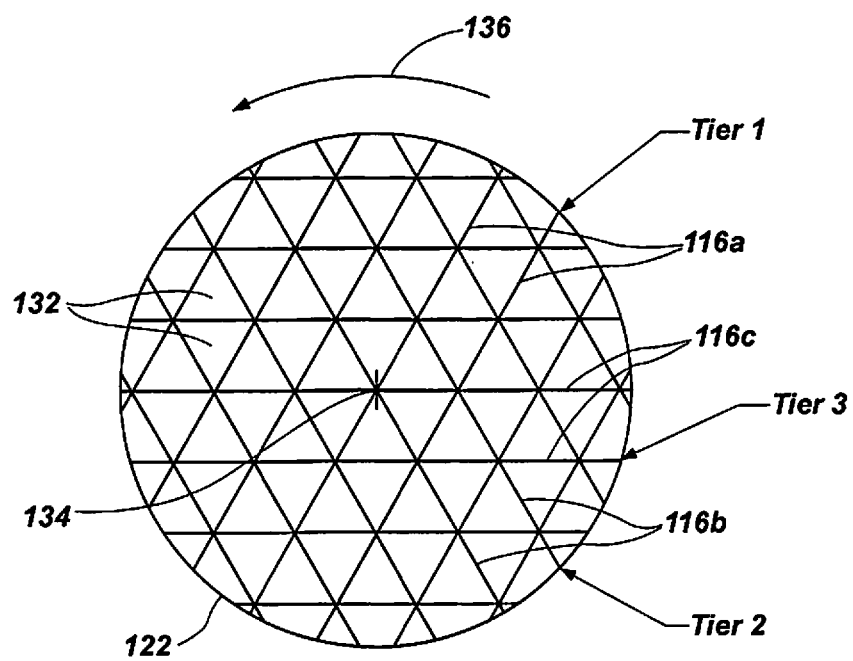
FIG. 13 is an end view diagram of the knife fixture of FIG. 11, showing the relative geometric arrangement of the different knife sets.

The respective annular rings 122a-c and their sets of blades 116a-c are also angularly offset relative to each other, in order to provide the twisted triangle shape. Shown in FIG. 13 is an end view schematic diagram of the knife fixture of FIG. 11, showing the relative geometric arrangement of the different knife sets. Due to the thickness of the blade holder rings 122, each layer has a tier height of 0.5". This figure schematically shows the relative angular orientation of the blades 116a of the lowest tier (labeled as "Tier 1" in FIG. 13), the blades 116b of the middle tier (labeled as "Tier 2" in FIG. 13), and the blades 116c of the upper tier (labeled as "Tier 3" in FIG. 13). The number of blades per tier can vary. While most of the knife fixture configurations shown herein include 5 blades per tier, the knife fixture shown in FIG. 13 includes 7 blades 116 per tier. The number of blades per tier can vary depending on both the cut size and the inside diameter of the blade holder ring. Blade holder rings having 2, 3, 4, 5, 6, 7 or more blades are suitable for making the spiral potato pieces disclosed herein, though it will be appreciated that a greater number of blades will involve a greater force for cutting.

This arrangement of blades produces what appears to be a grid of triangular openings, indicated generally at 132 in FIG. 13, through which a potato or other vegetable is forced by the water knife system. It is to be understood that these openings 132 are not actual openings in one structure, but are apparent or virtual openings that are produced by the respective groups of parallel blades 116 that are angularly offset with respect to each other. The relative shape and position of the groups of blades 116 effectively provides an aspect that is comparable to the presence of a group of triangular opening. The triangular virtual openings 132 appear when the knife fixture 110 is viewed from the end, which is the direction from which a vegetable unit is introduced to it. When a potato or other vegetable is forced through this rotary knife fixture 110, with the knife fixture rotating about its center of rotation 134 in the direction indicated by arrow 136, the potato (or other vegetable) will be rapidly sequentially cut by each group of blades 116, each set of blades cutting a different one of three sides of a triangular cross-sectional shape. In this way the potato or other vegetable will be substantially simultaneously cut into a plurality of twisted pieces, each piece having a triangular cross-sectional shape and a helical twist.

The angular offset of the sets of blades 116a-c can be selected in various ways to modify the shape of the resulting twisted pieces. For example, as suggested by the geometry of FIG. 13, the knife fixture 110 shown in FIGS. 11-13 is designed to produce helical pieces having an equilateral triangular cross-sectional shape. If the pieces were cut by a single grid of blades with triangular openings, these openings could have the exact desired equilateral triangular shape. In the specific embodiment shown and described with respect to FIGS. 11-13, the actual angular offset between the sets of blades is 120°, in order to compensate for the spacing between blade sets and the forward velocity of the vegetable unit and the rotational speed of the knife fixture. It is to be appreciated, however, that this is only one exemplary configuration.

In general, the angular offset between adjacent blades is determined based on the helical pitch P of the blades, and the tier height T, or on other words, the spacing of the blade sets (as opposed to the spacing of individual adjacent blades). Considering the embodiment of FIGS. 11-13, as the product advances from one tier to the next it moves a distance T, or 0.5" axially in this example. The pitch P of this particular helical cut is 3.0", so as product advances one tier of 0.5", the blade assembly rotates 0.5/3.0 times one full rotation of 360 degrees which is 60 degrees. The internal angle of the desired cut shape, an equilateral triangle in this case, is also 60 degrees. Therefore, the correct angular offset from one tier to the next is 60 plus 60 degrees, or a total of 120 degrees. The angular offset or blade holder rotation as product moves from one tier to the next will always be tier height T/helical pitch P×360 degrees. This figure can be added to the internal angle of the desired cut shape to calculate the required angular offset between tiers. For example, at T=0.5" and P=3.0", the holder rotation as product advances from one tier to the next would again be (0.5/3)×360=60 degrees. However, if square cut shapes are desired, an internal angle of 90 degrees would be added for a total angular offset of 60+90=150 degrees.

The geometry of the helical twist of each piece—i.e. its helical radius and orientation of the cut sides of the piece relative to the helical twist—will depend upon its position and orientation of the virtual triangular cross-section relative to the center of rotation of the cutting head. The pitch of the helical twist will depend upon the speed of rotation of the knife fixture 110 relative to the speed of passage of the product unit through the knife fixture. As noted below, the shape of the blade strongly influences this relationship. As with the embodiments shown and described above with respect to FIGS. 1-10, the knife fixture 110 can be rotated about its rotational axis 134 at a speed of about 6000 rpm, while vegetable units are pushed through it along that central axis at a linear speed of about 25 ft./s. With this set of operational parameters, the helically twisted pieces that are produced will have a helical pitch of about 3 inches. The helical pitch is built into the shape of the blades. The relationship between blade angle of attack and radius (distance from the center of rotation) defines the helical pitch of the blade. The RPM is constrained by the motor speed and drive system and will not fluctuate under normal loading. The linear speed of the product during cutting is primarily controlled by the blade pitch and RPM. During operation it is desirable to present the product to the cutting assembly at approximately the matching linear speed. This can be done by adjusting the flow rate of the hydraulic feed system. However, any mismatch in product speed can be overcome by the action of the 3" pitch blades and the RPM of the cutting head. The linear speed of the hydraulic feed system can approximate an ideal product velocity during the cut. The helical shape of the blade and the cutter RPM control the advance of the product and hence the cut pitch.

Given that different portions of the vegetable unit will pass through different portions of the knife fixture 110, different species of helical shapes will be formed by the single knife fixture, since the radius of rotation of the various virtual openings 132 differs, as does the orientation of the triangular cross section relative to the center of rotation. Shown in FIG. 14 is an end view schematic diagram of the effective cuts of the knife fixture 110 of FIG. 11, illustrating the various virtual openings 132 and the positional origin of different species of twisted triangles that can be cut thereby.

Figure 14:
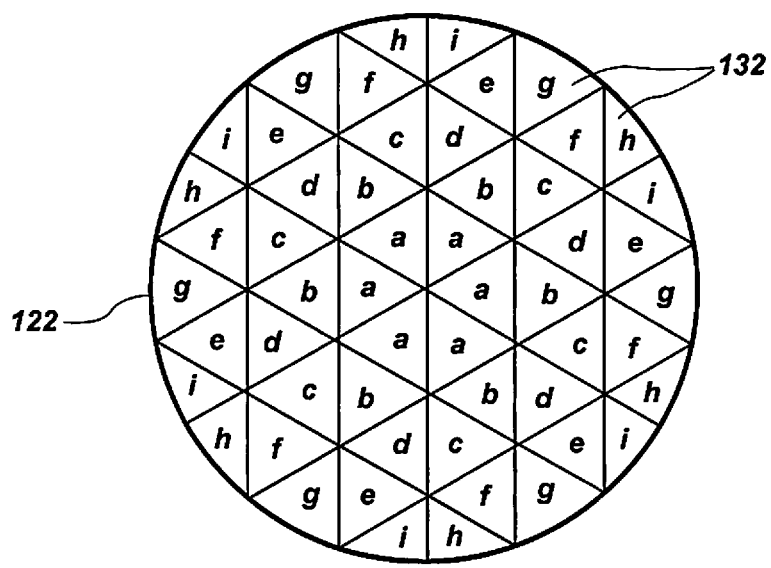
FIG. 14 is an end view schematic diagram of the knife fixture of FIG. 11, illustrating the positional origin of different species of twisted triangles that can be cut thereby.

Several observations can be made about the different species of twisted triangles that are suggested by FIG. 14. First, it will be apparent that this knife fixture 110 has a generally hexagonal symmetry, and provides fifty-four separate virtual openings 132 for cutting twisted triangle pieces. Second, it will be apparent that the different helically twisted triangle shapes that this knife fixture cuts will be distinguishable from each other on the basis of their helical radius (which depends on the distance of the respective opening 132 from the center of rotation 134), and the orientation of their triangular cross section relative to the center of rotation 134 of the fixture 110.

Analysis of the arrangement of the blades in this knife fixture reveals that this fixture will cut nine different species of twisted triangles. That is, the fifty-four virtual cutting openings 132 will produce pieces that present nine different species of shapes, with exactly six possible individuals in each species. Further, these shapes will fall into six general species groups, three of these species groups having substantially identical helical radii, though having differing orientation of their triangular shape relative to the center of rotation of the knife fixture. The similarities and differences of the different species and species groups are described in more detail below.

Shown in FIGS. 15-23 are perspective views of models of the nine different species, respectively, of twisted triangle pieces that can be cut by the knife fixture of FIG. 11. Each of these models represents two full helical rotations of the respective shape, for illustrative purposes only. It is to be appreciated, however, that where a natural product, such as a potato, is cut using the knife fixture 110 of FIG. 11, the overall diameter and varying cross-sectional shape of the product before cutting, as well as its particular length and relative alignment with the knife fixture 110 when it is cut, will affect the number, length and distribution of the twisted triangle pieces that are cut from any single potato or other product. Additionally, where a given triangular opening 132 intersects a curved, angled or irregular outer surface of the potato, the triangular cross-section of any given piece may be incomplete for some or all of its length.

Figure 15:
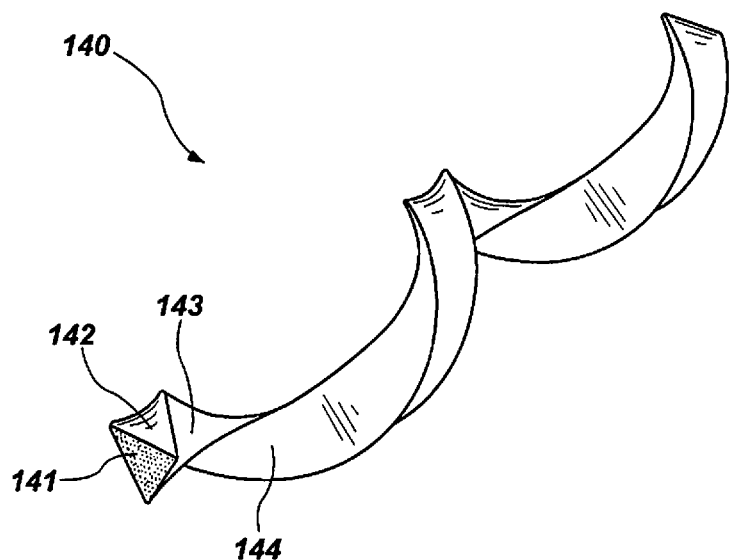
FIGS. 15-23 are perspective views of models of nine different species, respectively, of twisted triangle pieces that can be cut by the knife fixture of FIG. 11.

In FIGS. 15-23, each species is designated by the letters "a" through "i", which also correspond to the labels of the openings 132 in FIG. 14. Shown in FIG. 15 is an exemplary model of a first species, species "a," of twisted triangle piece 140 that can be cut by the knife fixture of FIG. 11. One triangular end surface 141 is visible, as are three longitudinal cut surfaces 142, 143 and 144 that extend along its length. This species includes the product pieces 140 that are cut by the six central openings of the knife fixture 110, which are labeled "a" in FIG. 14. These pieces 140 have the smallest helical radius of any of the pieces, since the six openings 132 that cut these pieces all abut the center of rotation 134 of the knife fixture 110. Where an elongate potato is cut lengthwise using this knife fixture 110, as is likely, these central pieces 140 will also tend to have the greatest length.

This species of helical pieces 140 stands alone as one of the species groups. That is, no other species shown in FIGS. 16-23 has the same helical radius or the same exact shape as the pieces of species a.

Figure 16:
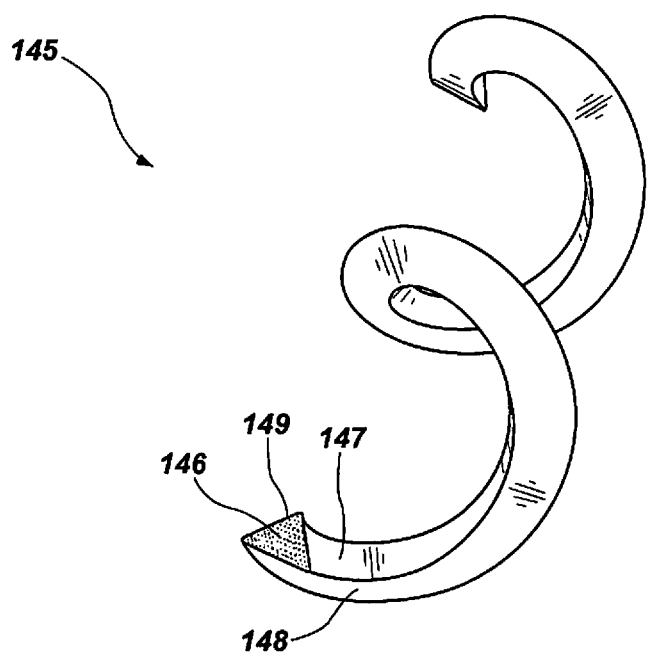

Shown in FIG. 16 is an exemplary model of a second species, species "b," of twisted triangle piece 145 that can be cut by the knife fixture of FIG. 11. One triangular end surface 146 is visible, as are three longitudinal cut surfaces 147, 148, 149 that extend along its length. This species includes the product pieces 145 cut by the openings 132 of the knife fixture 110 which are labeled "b" in FIG. 14. These pieces 145 have the second smallest helical radius of any of the pieces, since the triangular openings 132 that cut these pieces 145 each have a long side that abuts one of openings 132 for species a. This species also stands alone as one of the species groups, though its pieces 145 will have a similar helical radius as the pieces that make up species c and d, described below.

Figure 17:
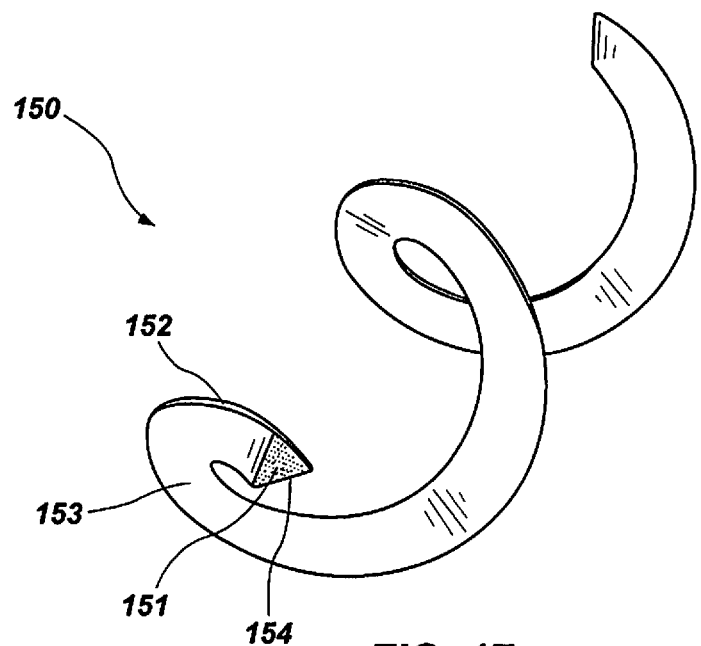

Shown in FIG. 17 is an exemplary model of a third species, species "c," of twisted triangle piece 150 that can be cut by the knife fixture of FIG. 11. One triangular end surface 151 is visible, as are three longitudinal cut surfaces 152, 153 and 154 that extend along its length. This species includes the product pieces 150 cut by the openings 132 of the knife fixture 110 which are labeled "c" in FIG. 14. These pieces 150 have the third smallest helical radius of any of the pieces, since the triangular openings 132 that cut these pieces 150 each have a point that abuts a corner of one of the openings 132 of species a. This species can be grouped together with the pieces of species d, described below, since its pieces 150 will have a helical radius that is identical to the pieces from species d, though the orientation of its triangular cross section relative to the center of rotation 134 of the knife fixture varies from that of species d.

Figure 18:
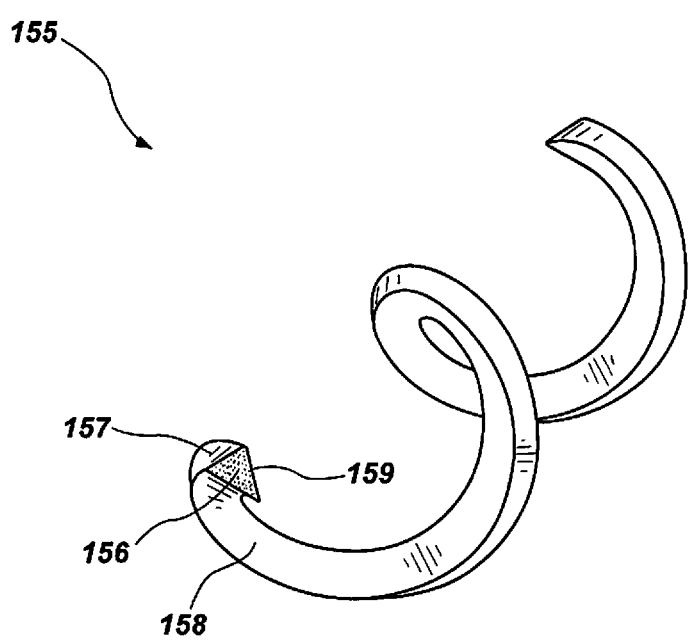

Shown in FIG. 18 is an exemplary model of a fourth species, species "d," of twisted triangle piece 155 that can be cut by the knife fixture of FIG. 11. One triangular end surface 156 is visible, as are three longitudinal cut surfaces 157, 158, 159 that extend along its length. This species includes the product pieces 155 cut by the openings 132 of the knife fixture 110 which are labeled "d" in FIG. 14. Like species c, these pieces have the third smallest helical radius, and can be grouped together with the pieces of species c, described above, since its pieces 155 will have a helical radius that is identical to that of the pieces from species c, but with a different angular orientation because of the orientation of its triangular cross section relative to the center of rotation 134 of the knife fixture 110. The difference in orientation between species c and d can be seen by comparing FIGS. 17 and 18.

Figure 19:
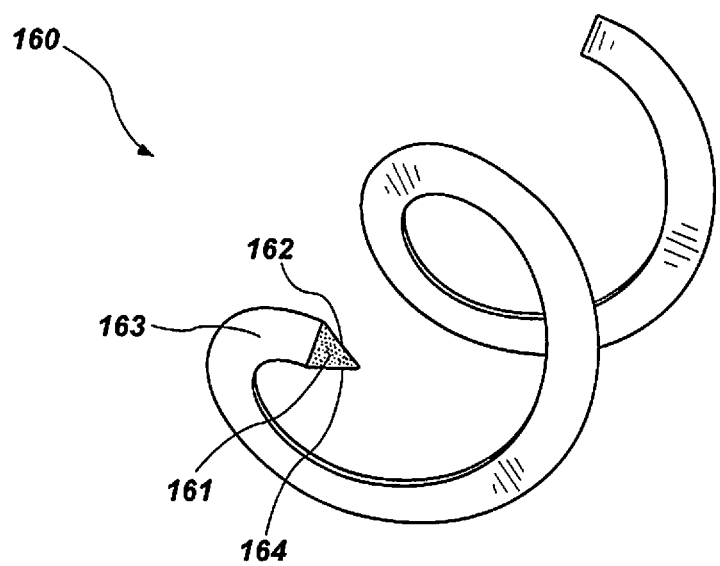

Shown in FIG. 19 is an exemplary model of a fifth species, species "e," of twisted triangle piece 160 that can be cut by the knife fixture of FIG. 11. One triangular end surface 161 is visible, as are three longitudinal cut surfaces 162, 163 and 164 that extend along its length. This species includes the product pieces 160 cut by the openings 132 of the knife fixture 110 which are labeled "e" in FIG. 14. These pieces have the next larger helical radius of the pieces, since the triangular openings 132 that cut these pieces 160 each have a long side that abuts one of openings for species d. This species can be grouped together with the pieces of species g, described below, since its pieces 160 will have a helical radius that is identical to that of the pieces from species g, though the orientation of its triangular cross section relative to the center of rotation 134 of the knife fixture 110 varies from that of species g.

Figure 20:
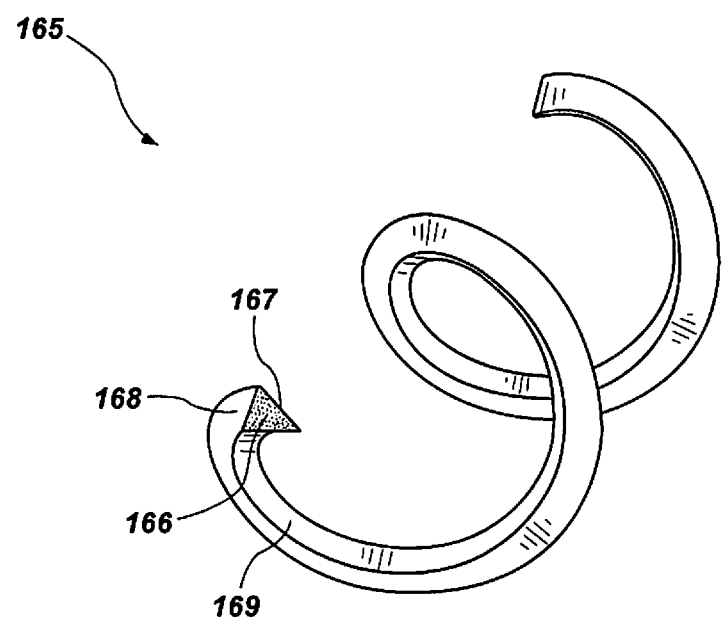

Shown in FIG. 20 is an exemplary model of a sixth species, species "f," of twisted triangle piece 165 that can be cut by the knife fixture of FIG. 11. One triangular end surface 166 is visible, as are three longitudinal cut surfaces 167, 168, 169 that extend along its length. This species includes the product pieces 165 cut by the openings 132 of the knife fixture 110 which are labeled "f" in FIG. 14. These pieces 165 have the third largest helical radius of any of the pieces. The triangular openings 132 that cut these pieces each have a point that abuts a corner of one of the openings of species b, c and d, and long sides that abut openings 132 of species e and g.

Species f stands alone as one of the species groups. That is, no other species has exactly the same helical radius or shape. However, its helical radius is similar to that of species e and g through i, though none of these other species have exactly the same radius or shape.

Figure 21:
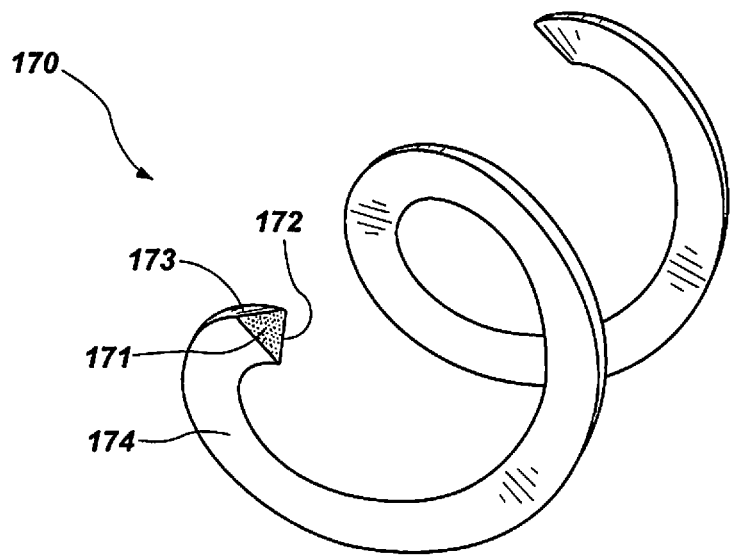

Shown in FIG. 21 is an exemplary model of a seventh species, species "g," of twisted triangle piece 170 that can be cut by the knife fixture of FIG. 11. One triangular end surface 171 is visible, as are three longitudinal cut surfaces 172, 173 and 174 that extend along its length. This species includes the product pieces 170 cut by the openings 132 of the knife fixture 110 which are labeled "g" in FIG. 14. These pieces 170 have the same helical radius as the pieces of species e, and are cut from triangular openings 132 that have a long side that abuts one of the openings for species c. This species can thus be grouped together with the pieces of species e, described above, though of course the orientation of its triangular cross section relative to the center of rotation 134 of the knife fixture 110 varies from that of species e. The difference in orientation between species e and g can be seen by comparing FIGS. 19 and 21.

Figure 22:
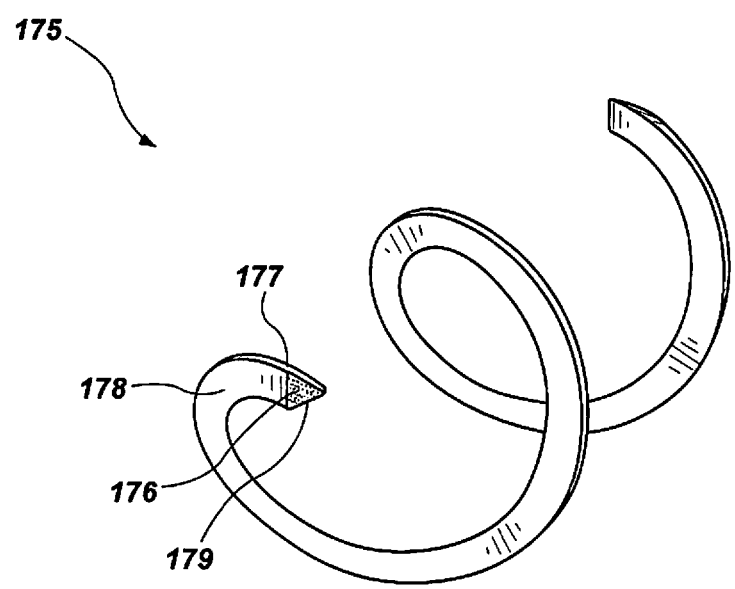

Shown in FIG. 22 is an exemplary model of an eighth species, species "h," of twisted triangle piece 175 that can be cut by the knife fixture of FIG. 11. One triangular end surface 176 is visible, as are three longitudinal cut surfaces 177, 178, 179 that extend along its length. This species includes the product pieces 175 cut by the openings 132 of the knife fixture 110 which are labeled "h" in FIG. 14. These pieces have the largest helical radius of any of the pieces. The triangular openings 132 that cut these pieces each have a long side that abuts one of the sides of an opening associated with species g, and a point that abuts a corner of one of the openings of species c and d. This species can be grouped together with the pieces of species i, described below, since its pieces will have a helical radius that is identical to the pieces from species i, though the orientation of its triangular cross section relative to the center of rotation 134 of the knife fixture 110 varies from that of species i.

Figure 23:
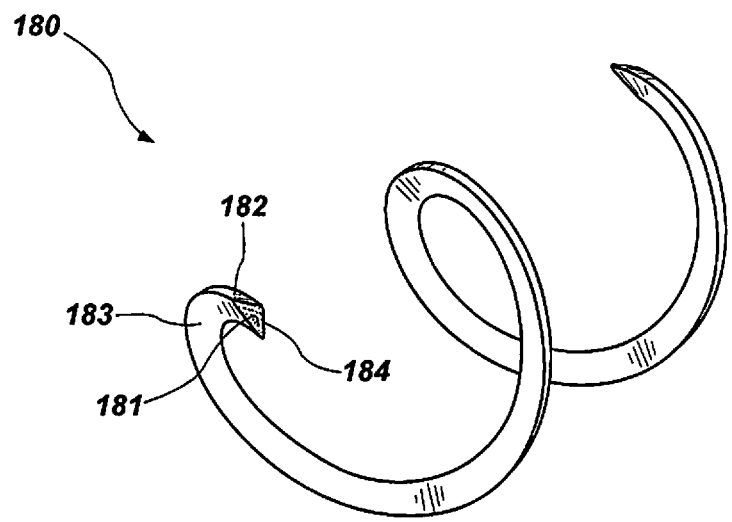

Shown in FIG. 23 is an exemplary model of a ninth species, species "i," of twisted triangle piece 180 that can be cut by the knife fixture of FIG. 11. One triangular end surface 181 is visible, as are three longitudinal cut surfaces 182, 183 and 184 that extend along its length. This species includes the product pieces 180 cut by the openings 132 of the knife fixture 110 which are labeled "i" in FIG. 14. These pieces 180 have the largest helical radius of any of the pieces. The triangular openings 132 that cut these pieces 180 each have a long side that abuts one of the sides of an opening associated with species e, another long side that abuts an adjacent opening 132 of species h, and a point that abuts a corner of one of the openings of species c and d. As discussed above, this species is grouped together with the pieces of species h, since its pieces 180 will have the same helical radius, though the orientation of its triangular cross section varies from that of species h. The difference in orientation between species h and i can be seen by comparing FIGS. 22 and 23.

Thus, the fifty-four individual twisted triangular pieces represented by pieces 140, 145, 150, 155, 160, 165, 170, 175 and 180 that can be cut by the knife fixture 110 can be divided into nine species (a through i) of six pieces each. These species can be further grouped into six groups that have identical helical radii, the six groups being (1) species a; (2) species b; (3) species c and d; (4) species e and g; (5) species f; and (6) species h and i. Each of these species provides a helically twisted triangular piece that has a unique combination of helical radius and triangular orientation, yet all of the pieces can be simultaneously cut from a single vegetable unit (e.g. a potato).

It is to be appreciated that the size, shape and helical pitch of the twisted triangular pieces 140, 145, 150, 155, 160, 165, 170, 175 and 180 produced by the knife fixture 110 of FIG. 11 will vary depending largely on the shape of the blade, as well as the overall size of the knife fixture 110, the spacing between the knives 116, and the rotational speed of the knife fixture 110 relative to the forward velocity of the potato or other product that passes therethrough. In one embodiment that has been tested, the knife fixture has an inner diameter of 3.125 inches, with the parallel knives 116 in each of the three groups or tiers of knives being spaced at 0.52" from each other. With this configuration, the twisted triangular pieces will have a cross section that has a dimension of about 0.6 inches on each side. With a forward velocity of the potato of 25 ft/s and the knife fixture 110 having a rotational speed of about 6000 rpm and a longitudinal spacing of the blade groups of 0.5", this will produce twisted helical pieces having a helical pitch of about 3 inches.

It is to be appreciated that the variables mentioned above are only one of many possible combinations that can be used in a system in accordance with this disclosure. Those of skill in the art will recognize that other combinations of sizes, speeds, blade pitch angles, etc. can also be used to produce different outcomes. For example, different blade spacings can be used to produce pieces with different cross-sectional sizes, and different blade pitch angles can be used to produce different helical pitches. Similarly, different blade shapes, such as curved blades or corrugated blades (as discussed above), can also be used to produce pieces with different shapes, crinkle-cut pieces, etc.

Figure 24:
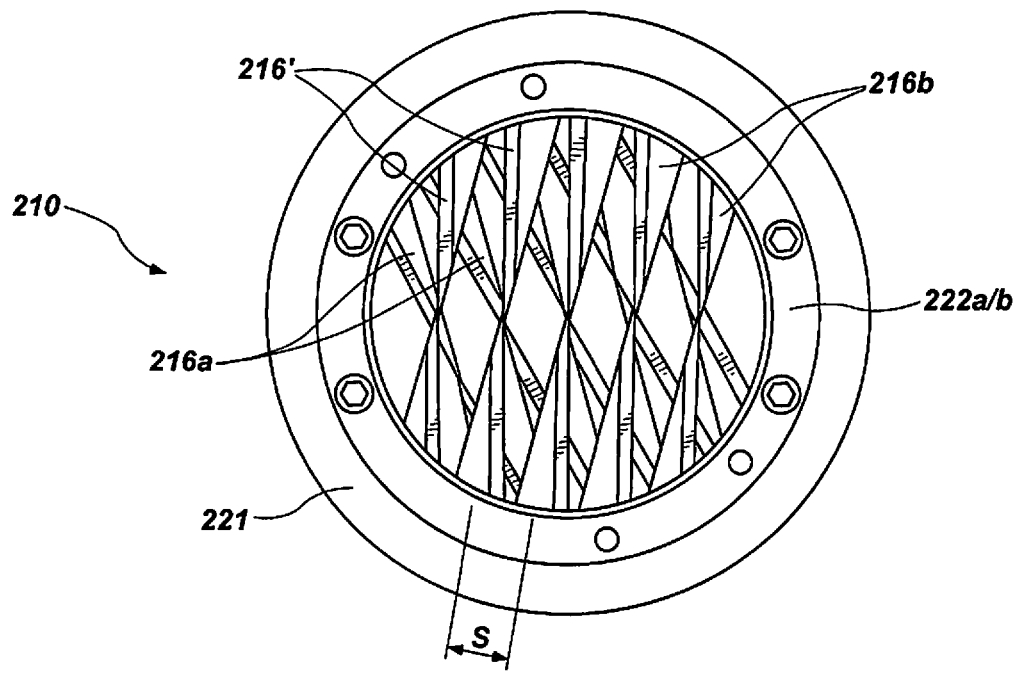
FIG. 24 is an end view of another embodiment of a knife fixture including two knife sets respectively supported by two blade holder rings and configured for cutting twisted square pieces, in accordance with the present disclosure.
Figure 25:
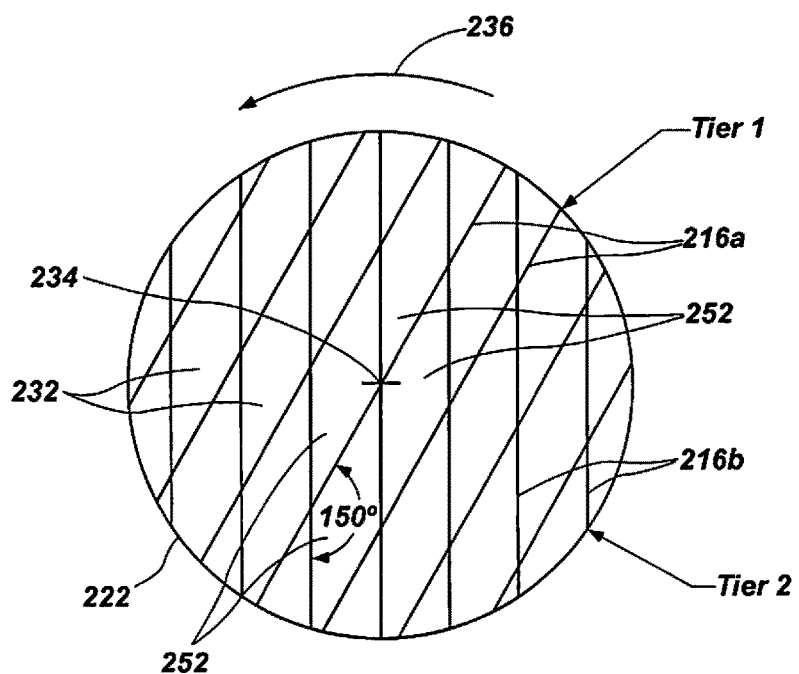
FIG. 25 is an end view diagram of the knife fixture of FIG. 24, showing the relative geometric arrangement of the different knife sets.

It has been found that different numbers of sets of blades and different angular orientations of the sets of blades can be used to produce twisted pieces of different cross-sectional shapes. For example, in addition to the twisted triangular shapes shown in FIGS. 15-23, helically twisted pieces having square and rhomboid shapes can be produced in a similar manner using two sets of blades. Shown in FIG. 24 is an end view of an embodiment of a knife fixture 210 configured for cutting twisted square pieces, and FIG. 25 provides an end view schematic diagram of the knife arrangement of this knife fixture 210, showing the relative geometric arrangement of the different knife sets. This knife fixture 210 includes two knife sets, indicated generally at 216, respectively supported by two blade holder rings 222, only the topmost ring 222b being visible in FIG. 24.

Like the knife fixture shown in FIGS. 11 and 12, this knife fixture 210 generally includes a lower annular ring 221, on which are mounted a succession of blade holder rings, indicated generally at 222. The individual blade holder rings 222 have an annular shape and each define a central aperture that accommodates the hydraulic flow path of the water knife system and through which a vegetable product (e.g. a potato) can flow.

The annular rings 222 each support a group of multiple parallel twisted blades, indicated generally at 216, having a spacing S between adjacent blades. The geometric details of the twisted shape of these blades can be as described above. The cutting blades 216 have a sharpened cutting edge 216' along one side thereof, and are twisted generally at a midpoint thereof, and have an angular orientation where they are attached to the support ring 222. As in the embodiment of FIGS. 11 and 12, the cutting blades 216 can be integrally attached to the inner cylindrical surface 225 of their respective ring 222, or they can be affixed with screws, bolts or other fasteners.

It is to be recognized that, while the twisted blades shown and described above with respect to FIGS. 1-10 are twisted generally at their radial center, which coincides with the longitudinal centerline or axis of the hydraulic flow path, in the embodiment of FIGS. 11-14 (and similarly of FIGS. 24-25 and 27-30) the point of twist of the blades 216 will be located at the midpoint or midspan of the blades 216, but that midspan point will coincide with the longitudinal centerline or axis of the hydraulic flow path (and the center of the ring 222) only for a blade that lies along the diameter of a given ring 222. Blades 216 that are off-center with respect to their ring 222 will have a twist point that is laterally offset from the center of the ring and the longitudinal centerline or axis of the hydraulic flow path. This aspect of the rotary knife fixture 210 allows for the creation of the variety of twisted helical shapes described herein.

The knife fixture 210 shown in FIG. 24 includes two sets or tiers of blades 216. The knife fixture 210 includes a lower or first blade holder ring 222a, which is attached directly to the base ring 221, and supports a first group or tier of blades 216a. A second blade holder ring 222b is attached atop the first blade holder ring 222a, and supports a second group or tier of blades 216b. The blade holder rings 222 can be attached to each other in the manner described above, and can have a uniform thickness, thus providing a uniform spacing of the groups or tiers of blades 216, as discussed above.

Shown in FIG. 25 is an end view schematic diagram of the knife fixture 210 of FIG. 24, showing the relative geometric arrangement of the different knife sets. This figure schematically shows the blades 216a of the lower tier (labeled as "Tier 1" in FIG. 25), angularly offset from the blades 216b of the upper tier (labeled as "Tier 2" in FIG. 25) by an angle of 150°. This arrangement of blades produces what appears to be a rhomboid grid of virtual openings, indicated generally at 232 in FIG. 25, through which a potato or other vegetable is forced by the water knife system. As discussed above, these openings 232 are not actual openings in one structure, but are apparent or virtual openings appear because the respective groups of parallel blades 216 are angularly offset with respect to each other.

When a potato or other vegetable is forced through this rotary knife fixture 210, with the knife fixture rotating about its center of rotation 234 in the direction indicated by arrow 236, the potato (or other vegetable) will be rapidly sequentially cut by the two groups of blades 216, each set of blades cutting opposing pairs of sides of a square cross-sectional shape. In this way the potato or other vegetable will be substantially simultaneously cut into a plurality of twisted pieces, each piece having a square cross-sectional shape and a helical twist.

The angular offset of the sets of blades 216a-b can be selected in various ways to modify the shape of the resulting twisted pieces. For example, as suggested by the geometry of FIG. 25, the knife fixture 210 shown in FIGS. 24-25 is designed to produce helical pieces having a square cross-sectional shape. The angular offset between the sets of blades is 150° in order to compensate for the spacing between blade sets, the forward velocity of the vegetable unit and the rotational speed of the knife fixture 210.

The geometry of the helical twist of each piece—i.e. its helical radius and orientation of the cut sides of the piece relative to the helical twist—will depend upon the position and orientation of each virtual opening 232 for its respective piece relative to the center of rotation 234 of the cutting head 210. The pitch of the helical twist will depend upon the speed of rotation of the knife fixture 210 relative to the speed of passage of the product unit through the knife fixture. As discussed above, different species of square helical shapes will be formed by the knife fixture 210, since the radius of rotation of the various virtual openings 232 differs. Those of skill in the art will be able to recognize and classify these various shapes as demonstrated above with respect to the knife fixture embodiment of FIGS. 11 and 12. The different helically twisted square shapes that this knife fixture 210 cuts will be distinguishable from each other on the basis of their helical radius (which depends on the distance of the respective opening 232 from the center of rotation 234), and the orientation of their opening 232 relative to the direction of rotation.

Figure 26:
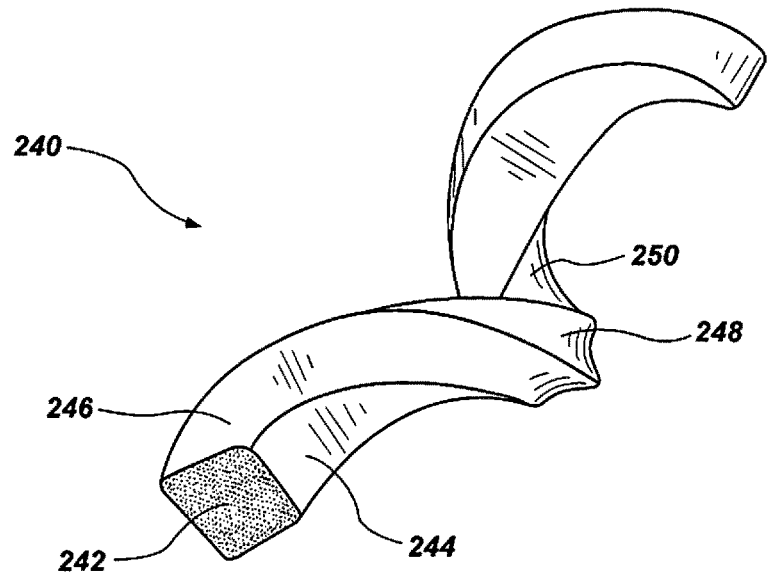
FIG. 26 is a perspective view of a twisted square piece that can be cut by the knife fixture of FIG. 24.

Shown in FIG. 26 is a perspective view of a twisted square piece 240 that can be cut by the knife fixture 210 of FIG. 24. One square end surface 242 is visible, as are four longitudinal cut surfaces 244, 246, 248 and 250, which extend along its length. It is to be understood that this twisted square piece 240 is just one of many different species of twisted square pieces that can be produced by the knife fixture 210 of FIG. 24. As discussed above with respect to the knife fixture of FIG. 11, the knife fixture 210 of FIG. 24 can produce multiple species of twisted square pieces that vary from each other in their helical radius. However, it is believed that, because the knife fixture is configured to produce cut pieces having a symmetrical cross section, the square shape of each piece will be substantially the same, subject to some considerations related to radius and orientation, as discussed below.

The particular twisted square piece 240 shown in FIG. 26 is a piece that would be cut by one of the four central openings 232 of the knife fixture 210 of FIG. 24, which are labeled 252 in FIG. 25. This piece 240 would have a relatively small helical radius. It is to be appreciated that a variety of other species would also be cut by this knife fixture, based on principles similar to those discussed above with respect to the knife fixture of FIGS. 11-14, and in a similar manner to the different twisted triangle species shown in FIGS. 15-23.

Figure 27:
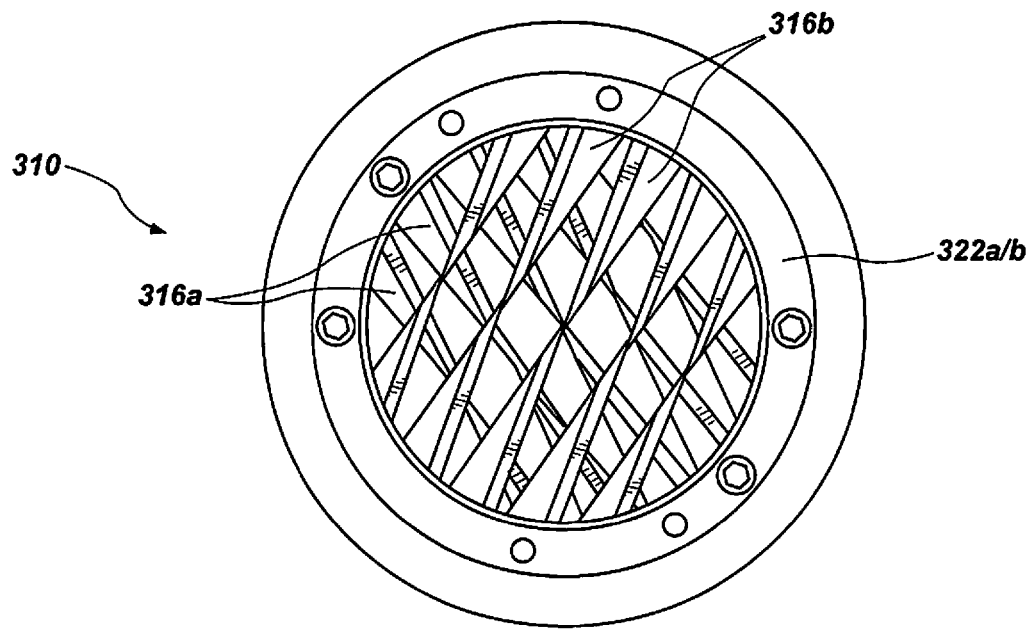
FIG. 27 is an end view of another embodiment of a knife fixture including two knife sets respectively supported by two blade holder rings and configured for cutting twisted rhomboid pieces, in accordance with the present disclosure.
Figure 28:
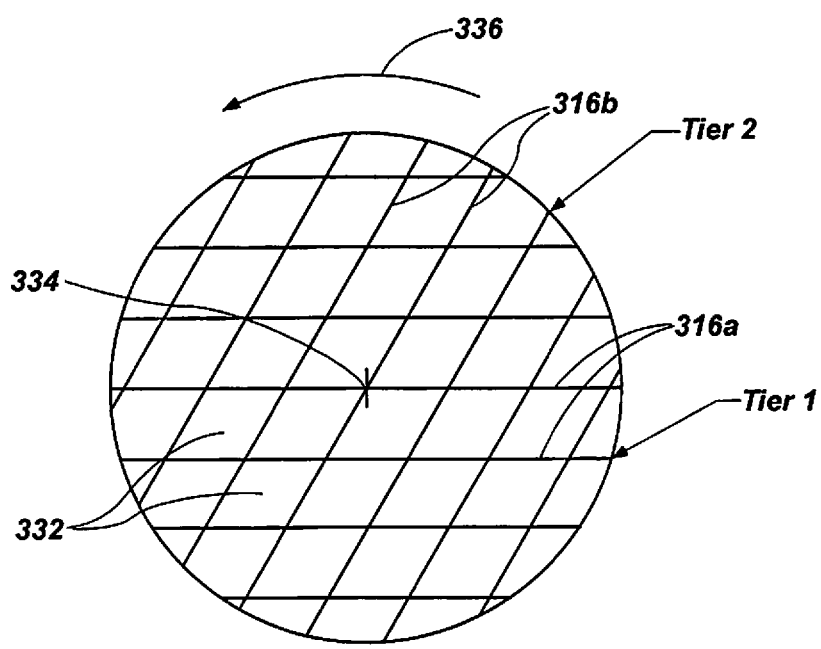
FIG. 28 is an end view diagram of the knife fixture of FIG. 27, showing the relative geometric arrangement of the different knife sets.

Shown in FIG. 27 is an end view of another embodiment of a knife fixture 310 including two knife sets 316a, 316b, respectively supported by two blade holder rings 322a, 322b and configured for cutting twisted rhomboid pieces, in accordance with the present disclosure. These blades 316 can be twisted in a manner like that described above with respect to the embodiment of FIGS. 11-14. Provided in FIG. 28 is an end view diagram of the knife fixture 310 of FIG. 27, showing the relative geometric arrangement of the different knife sets 316a, 316b, which are labeled "Tier 1" and Tier 2", respectively.

Like the knife fixtures of FIGS. 11 and 24, this knife fixture 310 includes multiple sets of parallel twisted blades 316 that are longitudinally offset from each other, each set of blades 316 being attached to a ring 322 and configured to simultaneously rotate as a potato or other vegetable is pushed therethrough. As shown in FIG. 28, the two knife sets 316a, b are angularly offset by an angle of 120°. This angular offset produces twisted helical pieces having a rhomboid cross-sectional shape, rather than a square shape. When a potato or other vegetable is forced through this rotary knife fixture 310, with the knife fixture rotating about its center of rotation 334 in the direction indicated by arrow 336, the potato (or other vegetable) will be rapidly sequentially cut by the two groups of blades 316, each set of blades cutting opposite sides of a rhomboid cross-sectional shape. In this way the potato or other vegetable will be substantially simultaneously cut into a plurality of twisted pieces, each piece having a rhomboid cross-sectional shape and a helical twist.

As discussed above with respect to the knife fixtures of FIGS. 11 and 24, the knife fixture of FIG. 27 will produce multiple species of twisted rhomboid pieces that vary from each other in their helical radius depending upon the particular location and orientation of the virtual opening 332 that produces them relative to the center of rotation of the knife fixture 310.

Figure 29:
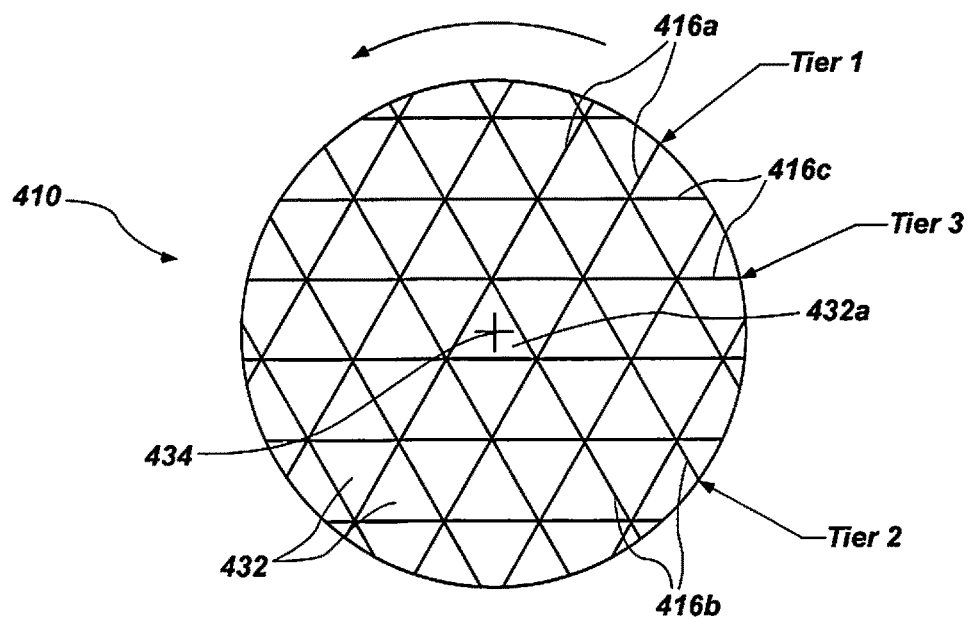
FIG. 29 is an end view diagram of another embodiment of a knife fixture for cutting twisted triangle pieces in accordance with the present disclosure, wherein the center of rotation of the knife fixture is located at a center of a triangular cutting space, rather than at a knife junction point.

Each of the knife fixtures shown in FIGS. 11, 24 and 27 are configured with a center of rotation (e.g. center 134, 234, 334) that is aligned with a virtual intersection of the cutting blades. However, different helically twisted shapes can be produced if the center of rotation of the knife fixture does not coincide with a virtual intersection of blades. Shown in FIG. 29 is an end view diagram of an embodiment of a knife fixture 410 for cutting twisted triangle pieces in which the center of rotation 434 of the knife fixture 410 is located at a center of a virtual cutting space 432, rather than at a knife junction point. This will produce a single axially twisted triangular piece (not shown) that is cut through the center aperture 432a, along with a variety of other different helical species having a triangular cross section that are produced by the other virtual apertures 432 of the knife fixture 410. This knife fixture 410 includes three sets of twisted knives 416a-c, respectively supported by three blade holder rings (not shown), and shaped in the manner discussed above with respect to FIGS. 11 and 12. The different knife sets 416a-c are also labeled Tier 1, Tier 2 and Tier 3 in FIG. 29, indicating their offset along the rotational axis 434.

Figure 30:
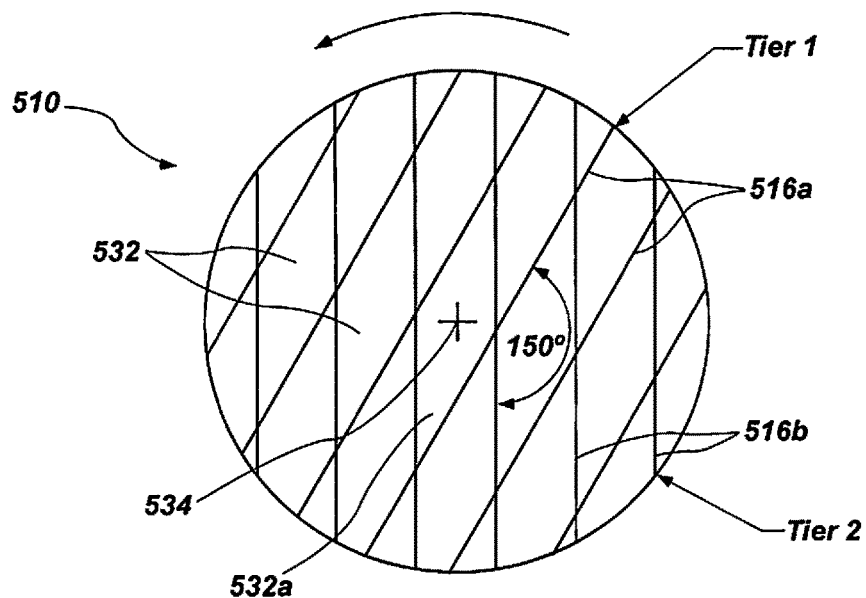
FIG. 30 is an end view diagram of another embodiment of a knife fixture for cutting twisted square pieces in accordance with the present disclosure, wherein the center of rotation of the knife fixture is located at a center of a square cutting space, rather than at a knife junction point.

Shown FIG. 30 is an end view diagram of another embodiment of a knife fixture 510 for cutting twisted square pieces, in which the center of rotation 534 of the knife fixture 510 is located at a center of a virtual cutting space 532, rather than at a virtual knife junction point. This figure shows the relative geometric arrangement of the different knife sets 516, this knife fixture 510 including two knife sets 516a, 516b that are respectively supported by two blade holder rings (not shown). This knife fixture 510 will produce a single axially twisted square piece (not shown) that is cut through the center aperture 532a, along with a variety of different helical species of pieces having a square cross-section that are produced by the other virtual apertures 532 of the knife fixture 510.

The blades of any of the embodiments shown in FIGS. 11-30 can also be modified in various ways to provide different cutting shapes or surfaces. For example, the cutting blades can be configured with corrugations or ridges, like the blade in FIG. 10, in order to produce crinkle-cut pieces, as discussed above. Other variations can also be made to the blades.

In general, any set of lines and curves could be drawn across the circle of a diagram such as FIG. 13. The location of each point on those lines or curves can be expressed as a polar coordinate pair, (r, θ). These points would all lie in the plane of the circle where z=0. The shapes outlined by these lines and curves and their intersections would be the cross sections of the product pieces to be cut. Since a blade of zero height would not have any mechanical strength, real blades must extend in the z direction. To minimize cutting force and product damage the blades should curve to follow the helical cut through the product. Each point in the plane of the circle will have a corresponding set of points that lie on the helix of the cutting path. These points where z>0 will have the form (r, θ+z/Pitch×360 degrees). This relationship can be used to describe the curvature of the blades in space using cylindrical coordinates of the form (r, θ, z). Avoiding physical intersections between the blades simplifies blade manufacture and product compression during cutting. These factors are among the reasons that virtual intersections and apertures as described above are considered desirable. The same helical relationship, (r, θ+z/Pitch×360 degrees), can be used to determine the location of points in the cutting edges of blades that lie in tiers where z>0. This relationship underlies the tier-to-tier offset angles such as 120 degrees for triangles and 150 degrees for squares.

Although various embodiments have been shown and described, the present disclosure is not so limited and will be understood to include all such modifications and variations are would be apparent to one skilled in the art. Accordingly, no limitation on the invention is intended by way of the foregoing description and accompanying drawings, except as set forth in the appended claims.

What is claimed is:

1. A system for cutting products propelled into cutting engagement therewith at a selected speed, comprising:
    a blade holder, configured to rotate about a rotational axis, having
        a generally ring-shaped aperture, surrounding the rotational axis;
        at least two parallel, vertically spaced, angularly offset groups of cutting blades, each group of cutting blades comprising a plurality of generally parallel helically-twisted cutting blades, carried by the blade holder and extending across the aperture, each cutting blade having a sharpened cutting edge at one side thereof and being twisted generally about a center point thereof to define a pair of cutting edges oriented in opposite-facing circumferential directions;
    a drive motor, configured to rotatably drive the blade holder at a selected rotational speed; and
    a hydraulic feed system, configured to feed products through the aperture at a selected linear speed while the blade holder is rotating, to substantially simultaneously cut the product into multiple helically twisted pieces.

2. The system of claim 1, wherein a spacing of the vertically spaced groups of cutting blades, and the rotational speed of the blade holder, and the linear speed of the hydraulic feed system are selected to produce helically twisted pieces having a helical pitch of about 3 inches.

3. The system of claim 2, wherein the spacing of the groups of cutting blades is about 0.5".

4. The system of claim 1, wherein the blade holder comprises a plurality of stackably attached blade holder rings, each group of cutting blades being carried by one of the blade holder rings, opposing ends of each cutting blade being integrally attached to an inner surface of a respective blade holder ring at a selected pitch angle.

5. The system of claim 1, wherein each group of cutting blades comprises exactly five cutting blades.

6. The system of claim 1, wherein the groups of cutting blades comprise exactly three groups of cutting blades, whereby the helically twisted pieces are given a triangular cross-sectional shape.

7. The system of claim 6, wherein the groups of cutting blades are angularly offset by an angle selected such that at least a subset of the helically twisted pieces are given an equilateral triangular cross-sectional shape.

8. The system of claim 1, wherein the groups of cutting blades define a plurality of virtual apertures, whereby the helically twisted pieces are produced in multiple species of shapes that vary in helical radius and orientation of their cross-section.

9. The system of claim 1, wherein the groups of cutting blades comprise exactly two groups of cutting blades, oriented at an angular offset selected such that at least some of the helically twisted pieces have a square cross-sectional shape.

10. The system of claim 1, wherein the groups of cutting blades comprise exactly two groups of cutting blades, oriented at an angular offset selected such that at least some of the helically twisted pieces have a rhomboid cross-sectional shape.

11. The system of claim 1, wherein at least some of the cutting blades have a corrugated cutting edge configured to produce crinkle-cut pieces.

12. The system of claim 1, wherein the rotational axis of the blade holder extends through a virtual intersection of cutting blades from each group of cutting blades.

13. The system of claim 1, wherein the rotational axis of the blade holder extends through a virtual aperture defined by the cutting blades of each group of cutting blades.

14. A helically twisted piece of product produced by the system of claim 1.

15. The helically twisted piece of product of claim 14, wherein the product is a vegetable product.

16. The helically twisted piece of product of claim 14, wherein the vegetable product is a potato.

17. A rotary knife fixture configured for use in a water knife cutting system, comprising:
    a ring, defining an internal aperture, configured to be placed in fluid communication with a hydraulic feed conduit of the water knife cutting system and for rotary motion about a rotational axis extending through the aperture; and
    at least two vertically spaced, angularly offset, parallel groups of cutting blades, each group of cutting blades comprising a plurality of parallel cutting blades, extending across the aperture generally perpendicular to the rotational axis, each cutting blade having a sharpened cutting edge at one side thereof and being twisted generally about a center point thereof to define a pair of cutting edges oriented in opposite-facing circumferential directions, whereby a vegetable product, fed through the aperture at a product speed, and with the rotary knife fixture rotating at a rotational speed, is substantially simultaneously cut into multiple helically twisted pieces.

18. The rotary knife fixture of claim 17, comprising exactly three vertically spaced, angularly offset, parallel groups of cutting blades, extending across the aperture, the angular offset selected to produce helically twisted pieces having a triangular cross-section.

19. The rotary knife fixture of claim 17, comprising exactly two vertically spaced, angularly offset, parallel groups of cutting blades, extending across the aperture, the angular offset selected to produce helically twisted pieces having a square or rhomboid cross-section.

20. The rotary knife fixture of claim 17, wherein the groups of cutting blades define a plurality of virtual apertures, whereby the helically twisted pieces are produced in multiple species of shapes that vary in helical radius and orientation of their cross-section, depending upon a particular virtual aperture associated with the cutting of a particular helically twisted piece.

21. The rotary knife fixture of claim 20, wherein the rotational axis of the blade holder extends through one of a virtual intersection of cutting blades from each group of cutting blades, and a virtual aperture defined by the cutting blades of each group of cutting blades.

22. The rotary knife fixture of claim 17, wherein at least some of the cutting blades have a corrugated cutting edge configured to produce crinkle-cut pieces.

23. The rotary knife fixture of claim 17, wherein the vegetable product is a potato.

24. A water knife cutting system for cutting potatoes into multiple helically twisted pieces, comprising:

a hydraulic feed system, configured to propel potatoes through a feed conduit at a selected linear speed;
a drive motor; and
a cutting head, having a rotatable blade holder, driven by the drive motor and configured to rotate about a rotational axis, having
  a generally ring-shaped aperture, in fluid communication with the feed conduit and surrounding the rotational axis;
  at least two parallel, vertically spaced, angularly offset groups of cutting blades, each group of cutting blades comprising a plurality of generally parallel cutting blades, carried by the blade holder and extending across the aperture, each cutting blade having a sharpened cutting edge at one side thereof and being twisted generally about a center point thereof to define a pair of cutting edges oriented in opposite-facing circumferential directions, the groups of cutting blades configured to contact and substantially simultaneously cut potatoes driven thereagainst by the feed system into a plurality of helically twisted pieces.

25. A helically twisted piece of product produced by the system of claim 24.

26. The helically twisted piece of product of claim 25, wherein the product is a vegetable product.

27. The helically twisted piece of product of claim 26, wherein the vegetable product is a potato.

* * * * *